United States Patent
Johnson-Buck et al.

(10) Patent No.: US 12,460,249 B2
(45) Date of Patent: Nov. 4, 2025

(54) PROTEIN ANALYTE DETECTION BY ANALIZING TIME-DEPENDENT SIGNALS FROM TRANSIENT BINDING EVENTS OF LABELED LOW-AFFINITY PROBES

(71) Applicant: THE REGENTS OF THE UNIVERSITY OF MICHIGAN, Ann Arbor, MI (US)

(72) Inventors: Alexander Edmund Johnson-Buck, Brighton, MA (US); Nils Walter, Ann Arbor, MI (US); Muneesh Tewari, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 863 days.

(21) Appl. No.: 15/914,729

(22) Filed: Mar. 7, 2018

(65) Prior Publication Data

US 2018/0258469 A1      Sep. 13, 2018

Related U.S. Application Data

(60) Provisional application No. 62/468,578, filed on Mar. 8, 2017.

(51) Int. Cl.
| | | |
|---|---|---|
| *C12Q 1/6809* | (2018.01) | |
| *C12N 9/22* | (2006.01) | |
| *C12P 19/34* | (2006.01) | |
| *C12Q 1/6834* | (2018.01) | |
| *C12Q 1/6876* | (2018.01) | |
| *C40B 40/06* | (2006.01) | |
| *G01N 33/53* | (2006.01) | |
| *G01N 33/542* | (2006.01) | |
| *G01N 33/543* | (2006.01) | |

(52) U.S. Cl.
CPC ............. *C12Q 1/6809* (2013.01); *C12N 9/22* (2013.01); *C12P 19/34* (2013.01); *C12Q 1/6834* (2013.01); *C12Q 1/6876* (2013.01); *C40B 40/06* (2013.01); *G01N 33/5308* (2013.01); *G01N 33/542* (2013.01); *G01N 33/54306* (2013.01)

(58) Field of Classification Search
CPC .. C12Q 1/6809; C12Q 1/6834; C12Q 1/6876; C12N 9/22; C12P 19/34; C40B 40/06; G01N 33/5308; G01N 33/542; G01N 33/54306
See application file for complete search history.

(56) References Cited

U.S. PATENT DOCUMENTS

| | | |
|---|---|---|
| 980,460 A | 1/1911 | Wall |
| 4,415,732 A | 11/1983 | Caruthers et al. |
| 4,458,066 A | 7/1984 | Caruthers et al. |
| 4,542,102 A | 9/1985 | Dattagupta et al. |
| 4,725,677 A | 2/1988 | Koster et al. |
| 4,937,188 A | 6/1990 | Giese et al. |
| 4,973,679 A | 11/1990 | Caruthers et al. |
| 4,980,460 A | 12/1990 | Molko et al. |
| 5,011,770 A | 4/1991 | Kung et al. |
| 5,143,854 A | 9/1992 | Pirrung et al. |
| 5,252,743 A | 10/1993 | Barrett et al. |
| 5,304,310 A | 4/1994 | Lang et al. |
| 5,366,859 A | 11/1994 | Miyoshi et al. |
| 5,412,087 A | 5/1995 | McGall et al. |
| 5,436,327 A | 7/1995 | Southern et al. |
| 5,445,934 A | 8/1995 | Fodor et al. |
| 5,601,980 A | 2/1997 | Gordon et al. |
| 5,604,097 A | 2/1997 | Brenner et al. |
| 5,624,711 A | 4/1997 | Sundberg et al. |
| 5,635,400 A | 6/1997 | Brenner et al. |
| 5,654,413 A | 8/1997 | Brenner et al. |
| 5,683,657 A | 11/1997 | Mian |
| 5,695,934 A | 12/1997 | Brenner et al. |
| 5,744,305 A | 4/1998 | Fodor et al. |
| 5,914,230 A | 6/1999 | Liu et al. |
| 5,972,612 A | 10/1999 | Malmgvist et al. |
| 6,001,983 A | 12/1999 | Benner |
| 6,474,159 B1 | 11/2002 | Foxlin et al. |
| 6,503,715 B1 | 1/2003 | Gold et al. |
| 6,511,854 B1 | 1/2003 | Asanov et al. |
| 6,514,768 B1 | 2/2003 | Guire et al. |
| 6,569,685 B1 | 5/2003 | Carson et al. |
| 7,668,697 B2 | 2/2010 | Volkov et al. |

(Continued)

FOREIGN PATENT DOCUMENTS

| | | |
|---|---|---|
| CN | 1928118 A | 3/2007 |
| CN | 104854241 A | 8/2015 |

(Continued)

OTHER PUBLICATIONS

Teerapanich, P.; Pugnière, M.; Henriquet, C.; Lin, Y.-L.; Chou, C.-F.; Leïchlé, T. Nanofluidic Fluorescence Microscopy (NFM) for Real-Time Monitoring of Protein Binding Kinetics and Affinity Studies. Biosensors and Bioelectronics 2017, 88, 25-33.*
Thompson, R. E.; Larson, D. R.; Webb, W. W. Precise Nanometer Localization Analysis for Individual Fluorescent Probes. Biophysical Journal 2002, 82 (5), 2775-2783.*
Ohlson, S.; Jungar, C.; Strandh, M.; Mandenius, C.-F. Continuous Weak-Affinity Immunosensing. Trends in Biotechnology 2000, 18 (2), 49-52.*
Partial Search Report of related EP Application No. 18763232.8, mailed Dec. 18, 2020, 16 pages.
Search Report of related EP Application No. 20168479.2, mailed Jul. 27, 2020, 11 pages.

(Continued)

*Primary Examiner* — Soren Harward
*Assistant Examiner* — Dawn Bickham
(74) *Attorney, Agent, or Firm* — c/o Casimir Jones, S.C.; Thomas A. Isenbarger

(57) ABSTRACT

Provided herein is technology relating to the detection of analytes and particularly, but not exclusively, to methods, systems, compositions, and kits for detecting analytes such as nucleic acids, proteins, small molecules, and other molecules using a technology based on the transient binding of detection probes.

11 Claims, 3 Drawing Sheets

(56) References Cited

U.S. PATENT DOCUMENTS

| | | |
|---|---|---|
| 7,935,822 B2 | 5/2011 | Arden-Jacob |
| 8,198,604 B2 | 6/2012 | Mertz |
| 8,367,323 B2 | 2/2013 | Douglas et al. |
| 8,846,924 B2 | 9/2014 | Zilles et al. |
| 10,093,967 B2 | 10/2018 | Walter et al. |
| 2002/0022217 A1 | 2/2002 | Sabanayagan et al. |
| 2002/0081629 A1 | 6/2002 | Pauwels et al. |
| 2002/0090650 A1 | 7/2002 | Empedocles et al. |
| 2002/0168652 A1 | 11/2002 | Werner et al. |
| 2003/0003486 A1 | 1/2003 | Sauer et al. |
| 2003/0064507 A1 | 4/2003 | Gallagher et al. |
| 2003/0087242 A1 | 5/2003 | Mirkin et al. |
| 2003/0124592 A1 | 7/2003 | Puskas |
| 2003/0148519 A1 | 8/2003 | Engelke et al. |
| 2003/0175740 A1 | 9/2003 | Mullinax et al. |
| 2004/0229254 A1 | 11/2004 | La Clair |
| 2005/0053942 A1 | 3/2005 | Kauppinen et al. |
| 2005/0136408 A1 | 6/2005 | Tom May et al. |
| 2005/0147976 A1 | 7/2005 | Xing |
| 2005/0244863 A1 | 11/2005 | Mir |
| 2006/0014172 A1 | 1/2006 | Muller et al. |
| 2006/0014212 A1* | 1/2006 | Benkovic ............... B82Y 5/00 435/7.1 |
| 2006/0046311 A1 | 3/2006 | Sun et al. |
| 2006/0094033 A1 | 5/2006 | Abulencia et al. |
| 2006/0172318 A1 | 8/2006 | Medinz et al. |
| 2006/0179585 A1 | 8/2006 | Zilles et al. |
| 2006/0257927 A1 | 11/2006 | Mehigh et al. |
| 2007/0037152 A1 | 2/2007 | Drmanac |
| 2007/0059743 A1 | 3/2007 | Sepulveda et al. |
| 2007/0248958 A1 | 10/2007 | Jovanovich et al. |
| 2008/0044919 A1 | 2/2008 | Dowben et al. |
| 2008/0076130 A1 | 3/2008 | Guo |
| 2008/0090259 A1 | 4/2008 | Toone et al. |
| 2009/0047664 A1 | 2/2009 | Vullev et al. |
| 2009/0061535 A1 | 3/2009 | Dowd et al. |
| 2009/0062736 A1 | 3/2009 | Jan |
| 2009/0066348 A1 | 3/2009 | Shin et al. |
| 2009/0084980 A1 | 4/2009 | Mertz |
| 2010/0031700 A1 | 2/2010 | Wilkinson et al. |
| 2010/0137152 A1 | 6/2010 | Gorfinkel et al. |
| 2010/0158850 A1 | 6/2010 | Baker, Jr. et al. |
| 2010/0262374 A1 | 10/2010 | Hwang et al. |
| 2010/0317005 A1 | 12/2010 | Hardin et al. |
| 2011/0065209 A1 | 3/2011 | Heil et al. |
| 2011/0065597 A1 | 3/2011 | Williams et al. |
| 2011/0152215 A1 | 6/2011 | Breaker et al. |
| 2011/0159481 A1 | 6/2011 | Liu et al. |
| 2011/0172420 A1 | 7/2011 | Zilles et al. |
| 2011/0190486 A1 | 8/2011 | Zilles et al. |
| 2011/0210272 A1 | 9/2011 | Chan |
| 2011/0223677 A1 | 9/2011 | Pojer et al. |
| 2011/0227558 A1 | 9/2011 | Mannion et al. |
| 2011/0257378 A1 | 10/2011 | Tran et al. |
| 2012/0010390 A1 | 1/2012 | Van Alstine |
| 2012/0077191 A1 | 3/2012 | Gunning |
| 2012/0164693 A1 | 6/2012 | Lockhart et al. |
| 2012/0238473 A1 | 9/2012 | Gridelet et al. |
| 2013/0011833 A1 | 1/2013 | Qauke et al. |
| 2013/0012527 A1 | 1/2013 | Breaker et al. |
| 2013/0045872 A1 | 2/2013 | Zhou et al. |
| 2013/0065784 A1 | 3/2013 | Takayama et al. |
| 2013/0071837 A1 | 3/2013 | Winters-Hilt et al. |
| 2013/0122525 A1 | 5/2013 | Blanchard et al. |
| 2013/0261019 A1 | 10/2013 | Lin et al. |
| 2013/0295688 A1 | 11/2013 | Bailey et al. |
| 2014/0001055 A1 | 1/2014 | Elibol et al. |
| 2014/0045277 A1 | 2/2014 | Gordon et al. |
| 2014/0302486 A1 | 10/2014 | Seelig et al. |
| 2015/0031577 A1 | 1/2015 | Boissinot et al. |
| 2015/0051105 A1 | 2/2015 | Ueno et al. |
| 2015/0141285 A1 | 5/2015 | Levicky et al. |
| 2015/0330974 A1 | 11/2015 | Staker et al. |
| 2016/0010076 A1 | 1/2016 | Joung et al. |
| 2016/0016990 A1 | 1/2016 | Richter et al. |
| 2016/0046988 A1 | 2/2016 | Walter et al. |
| 2016/0054261 A1 | 2/2016 | Kayyem |
| 2016/0161472 A1 | 6/2016 | Jungmann et al. |
| 2016/0169903 A1 | 6/2016 | Dai et al. |
| 2016/0266105 A1 | 9/2016 | Ismagilov et al. |
| 2016/0289659 A1 | 10/2016 | Doudna et al. |
| 2016/0312272 A1 | 10/2016 | Barish et al. |
| 2016/0326576 A1 | 11/2016 | Cook et al. |
| 2017/0354967 A1 | 12/2017 | Tao et al. |
| 2018/0002743 A1 | 1/2018 | Lockwood et al. |
| 2018/0258469 A1 | 9/2018 | Johnson-Buck et al. |
| 2019/0032120 A1 | 1/2019 | Walter et al. |
| 2019/0048415 A1 | 2/2019 | Walter et al. |
| 2019/0106739 A1 | 4/2019 | Terbrueggen |
| 2019/0187031 A1 | 6/2019 | Johnson-Buck et al. |
| 2019/0203279 A1 | 7/2019 | Landegren et al. |
| 2019/0339266 A1 | 11/2019 | Liu |
| 2021/0116369 A1 | 4/2021 | Thrush et al. |
| 2021/0230688 A1 | 7/2021 | Johnson-Buck |
| 2021/0292837 A1 | 9/2021 | Johnson-Buck et al. |
| 2021/0318296 A1 | 10/2021 | Johnson-Buck et al. |
| 2021/0348230 A1 | 11/2021 | Walter et al. |

FOREIGN PATENT DOCUMENTS

| | | |
|---|---|---|
| CN | 109790541 A | 5/2019 |
| EP | 2300983 B1 | 5/2012 |
| EP | 2465943 A2 | 6/2012 |
| EP | 2800811 B1 | 11/2014 |
| EP | 2837695 A1 | 2/2015 |
| JP | H09504950 A | 5/1997 |
| JP | 2001517925 A | 10/2001 |
| JP | 2002535013 A | 10/2002 |
| JP | 2003-513271 | 4/2003 |
| JP | 2003513271 A | 4/2003 |
| JP | 2003180374 A | 7/2003 |
| JP | 2003-250600 | 9/2003 |
| JP | 2003250600 A | 9/2003 |
| JP | 2006524811 A | 11/2006 |
| JP | 2008500831 A | 1/2008 |
| JP | 2015523856 A | 8/2015 |
| JP | 2016532689 A | 10/2016 |
| JP | 2017-513015 | 5/2017 |
| KR | 101710026 B1 | 2/2017 |
| WO | WO19900007582 A1 | 7/1990 |
| WO | WO 1990015070 A1 | 12/1990 |
| WO | WO 1991000868 A1 | 1/1991 |
| WO | WO 1991007087 A1 | 5/1991 |
| WO | WO 1995013399 A1 | 5/1995 |
| WO | WO 1997004129 A1 | 2/1997 |
| WO | WO 97/09342 A1 | 3/1997 |
| WO | WO 98/39484 A1 | 9/1998 |
| WO | WO 99/67425 | 12/1999 |
| WO | WO 200011446 A2 | 3/2000 |
| WO | WO-0101025 A2 | 1/2001 |
| WO | WO2001001025 A3 | 1/2001 |
| WO | WO 2006128138 A2 | 11/2006 |
| WO | WO 2008030071 A1 | 3/2008 |
| WO | WO 2010085548 A2 | 7/2010 |
| WO | WO 2011116256 A2 | 9/2011 |
| WO | WO 2011159537 A2 | 12/2011 |
| WO | WO-2013039449 A1 | 3/2013 |
| WO | WO 20130153911 A1 | 10/2013 |
| WO | WO 2014018584 A1 | 1/2014 |
| WO | WO-2015017586 A1 | 2/2015 |
| WO | WO-2015116686 A1 | 8/2015 |
| WO | WO 2015134938 A1 | 9/2015 |
| WO | WO-2016014409 A1 | 1/2016 |
| WO | WO 2016025477 A1 | 2/2016 |
| WO | WO 2016028843 A2 | 2/2016 |
| WO | WO 2016123243 A1 | 8/2016 |
| WO | WO 2016172727 A1 | 10/2016 |
| WO | WO 2017041030 A1 | 3/2017 |
| WO | WO 2017139354 A1 | 8/2017 |
| WO | WO-2018058085 A1 | 3/2018 |
| WO | WO-2018140157 A1 | 8/2018 |
| WO | WO 2018165309 A1 | 9/2018 |
| WO | WO 2019118705 A1 | 6/2019 |
| WO | WO 2020023503 A1 | 1/2020 |

(56) References Cited

FOREIGN PATENT DOCUMENTS

| WO | WO-2020069045 A1 | 4/2020 |
|----|------------------|--------|
| WO | WO 2021154935 A1 | 8/2021 |
| WO | WO 2021188308 A1 | 9/2021 |
| WO | WO 2022/039594 | 2/2022 |
| WO | WO 2023/004248 | 1/2023 |
| WO | WO-2023064319 A1 | 4/2023 |
| WO | WO 2024/015927 | 1/2024 |
| WO | WO-2024015927 A2 | 1/2024 |

OTHER PUBLICATIONS

The definition of "empirically" provided by the online dictionary at lexico.com [retrieved on Sep. 1, 2020]. Retrieved from the internet <URL: www.lexico.com/definition/empirically>.

Bettegowda et al., "Detection of Circulating Tumor DNA in Early- and Late-Stage Human Malignancies" Science translational medicine. Feb. 19, 2014;6(224).

Chang, "Single molecule enzyme-linked immunosorbent assays: theoretical considerations" J Immunol Methods. Apr. 30, 2012;378(1-2).

Chatterjee et al., "Direct kinetic fingerprinting and digital counting of single protein molecules" Proceedings of the National Academy of Sciences Sep. 2020, 117 (37) 22815-22822.

Freidel et al., "Chemical tags for site-specific fluorescent labeling of biomolecules" Amino Acids, 2016 48: 1357-72.

Gervais et al., "Mass transport and surface reactions in microfluidic systems" Chemical Engineering Science, 2006 61(4): 1102-1121.

Ghandhi, "VLSI Fabrication Principles" Wiley (1994) (2e)Chapter 10.

Glaser, "Antigen-antibody binding and mass transport by convection and diffusion to a surface: a two-dimensional computer model of binding and dissociation kinetics" Analytical Biochemistry, Aug. 15, 1993;213(1):152-61.

Green et al., "A review of passive and active mixing systems in microfluidic devices" 2007 Int. Journal of Multiphysics 2007 vol.1 (1).

Hibbert et al., "Kinetics of Irreversible Adsorption with Diffusion: Application to Biomolecule Immobilization" Langmuir 2002, 18, 5, 1770-1776.

Hofmann et al., "Three-dimensional microfluidic confinement for efficient sample delivery to biosensor surfaces. application to immunoassays on planar optical waveguides" Analytical Chemistry, Oct. 15, 2002;74(20):5243-50.

Huisgen "Centenary Lecture—1,3-Dipolar Cycloadditions" Proceedings of the Chemical Society of London, 1961, 357.

Husain et al., "Monitoring Daily Dynamics of Early Tumor Response to Targeted Therapy by Detecting Circulating Tumor DNA in Urine" Clinical Cancer Research, 2017, 23: 4716-23.

Jewett et al., "Cu-free click cycloaddition reactions in chemical biology" 2010 Chemical Society reviews, 39: 1272-79.

Jones, "Resonance energy transfer: from fundamental theory to recent applications" Frontiers in Physics 2001, Article 100, 7: 1-19.

Kim et al., "Biomedical applications of copper-free click chemistry: in vitro, in vivo, and ex vivo" Chemical science, 2019, 10: 7835-51.

Kolb et al. "Click Chemistry: Diverse Chemical Function from a Few Good Reactions" Angewandte Chemie International Edition 40(11): 2004-2021.

Lee et al., "Quantitation of genomic DNA in plasma and serum samples: higher concentrations of genomic DNA found in serum than in plasma" Transfusion (Paris) 2001, 41: 276-82.

Lehninger, Principles of Biochemistry, 793-800 (Worth Pub. 1982)). TOC.

MacDonald et al., "Direct single-molecule counting for immunoassay applications" Analytical Biochemistry, Feb. 1, 2019;566:139-145.

Miller et al., "A digital microfluidic approach to heterogeneous immunoassays" Analytical and Bioanalytical Chemistry, Jan. 2011;399(1):337-45.

Selmi et al., "Optimization of microfluidic biosensor efficiency by means of fluid flow engineering" 2017 Scientific Reports 7, 5721.

Shamsi et al., "A digital microfluidic electrochemical immunoassay" Lab Chip. Feb. 7, 2014;14(3):547-54.

Stott et al., "Isolation of circulating tumor cells using a microvortex-generating herringbone-chip" Proceedings of the National Academy of Sciences 2010 26;107(43):18392-7.

Stroock et al., "Chaotic mixer for microchannels" Science. 2002 25;295(5555):647-51.

Unger et al., "Monolithic microfabricated valves and pumps by multilayer soft lithography" Science. Apr. 7, 2000;288(5463):113-6.

Ward et al., "Mixing in microfluidic devices and enhancement methods" J. Micromech. Microeng., Sep. 2015;25(9):09400.

Yang et al., "Effects of diffusion boundary layer on reaction kinetics of immunoassay in a biosensor" Journal of Applied Physics, 2008 103, 084702.

Zhang et al., "Control of DNA strand displacement kinetics using toehold exchange" Journal of the American Chemical Society, 2009, 131: 17303-14.

Zhou et al. "High Water Content Hydrogel With Super High Refractive Index" Macromolecular Bioscience, 2013 13, 1485-1491.

International Search Report and Written Opinion for PCT/US2021/015407 dated Apr. 29, 2021, 13 pages.

International Search Report and Written Opinion for PCT/US2021/021009 dated Jun. 3, 2021, 12 pages.

Extended EP Search Report of related EP Application No. 20198764.1, mailed Mar. 1, 2021, 6 pages.

Extended EP Search Report of related EP Application No. 18763232.8, mailed Mar. 17, 2021, 20 pages.

EPO Communication for EP Application No. 20168479.2, mailed Jun. 16, 2021, 6 pages.

Extended EP Search Report of related EP Application No. 18888885.3, mailed Aug. 12, 2021, 8 pages.

Abelson et al., "Conformational dynamics of single pre-mRNA molecules during in vitro splicing." Nat Struct Mol Biol. Apr. 2010;17(4):504-12.

Adessi et al., "Solid phase DNA amplification: characterisation of primer attachment and amplification mechanisms." Nucleic acids research, 2000, 28(20): e87.

Allawi et al., "Thermodynamics and NMR of internal G.T mismatches in DNA." Biochemistry. Aug. 26, 1997; 36(34):10581-94.

Anders et al., "Structural basis of PAM-dependent target DNA recognition by the Cas9 endonuclease" Nature. Sep. 25, 2014;513(7519):569-73.

Anderson et al. "Quantitative Filter Hybridization in Nucleic Acid Hybridization: A Practical Approach, RD. Hames and SJ Higgens, editors." (1985), pp. 73-111.

Athamanolap et al., "Trainable high resolution melt curve machine learning classifier for large-scale reliable genotyping of sequence variants." PLoS One. Oct. 2, 2014;9(9):e109094.

Beaucage et al., "Advances in the Synthesis of Oligonucleotides by the Phosphoramidite Approach" Tetrahedron Mar. 20, 1992, 48(12): 2223-2311.

Bishop (2006) Pattern Recognition and Machine Learning, Springer.

Call et al., "Fabrication of DNA microarrays using unmodified oligonucleotide probes." Biotechniques. Feb. 2001; 30(2):368-72.

Canny , "A Computational Approach to Edge Detection" IEEE Transactions on Pattern Analysis and Machine Intelligence. 8(6): 679-698, 1986.

Carrington et al., "Role of MicroRNAs in Plant and Animal Development" Science 2003, 301:336-338.

Chan et al., "Direct quantification of single-molecules of microRNA by total internal reflection fluorescence microscopy." Anal Chem. Aug. 15, 2010; 82(16):6911-8.

Cullen, "RNA interference: antiviral defense and genetic tool." Nat Immunol. Jul. 2002; 3(7):597-9.

Ditzler et al., "A rugged free energy landscape separates multiple functional RNA folds throughout denaturation." Nucleic Acids Res. Dec. 2008;36(22):7088-99.

Doty et al., "Strand Separation and Specific Recombination in Deoxyribonucleic Acids: Physical Chemical Studies." Proc Natl Acad Sci U S A. Apr. 1960; 46(4):461-76.

(56) References Cited

OTHER PUBLICATIONS

Duda et al., (2001) Pattern classification (2nd edition), Wiley, New York.
Dupuis et al., "Single-molecule kinetics reveal cation-promoted DNA duplex formation through ordering of single-stranded helices." Biophys J. Aug. 6, 2013;105(3):756-66.
Elbashir et al., "Functional anatomy of siRNAs for mediating efficient RNAi in *Drosophila melanogaster* embryo lysate." EMBO J. Dec. 3, 2001; 20(23):6877-88.
Ewans, Stochastic Processes (i): Poisson Processes and Markov Chains in Statistics for Biology and Health—Statistical Methods in Bioinformatics (Ewans and Grant, eds.), Springer (New York, 2001), p. 129 et seq.
Fodor et al., "Light-directed, spatially addressable parallel chemical synthesis." Science. Feb. 15, 1991; 251(4995):767-73.
Grishok et al., "Genes and mechanisms related to RNA interference regulate expression of the small temporal RNAs that control C. elegans developmental timing." Cell. Jul. 13, 2001; 106(1): 23-34.
Gunnarsson et al., "Single-molecule detection and mismatch discrimination of unlabeled DNA targets." Nano Lett. Jan. 2008;8(1):183-8.
Guo et al., "Direct fluorescence analysis of genetic polymorphisms by hybridization with oligonucleotide arrays on glass supports." Nucleic Acids Res. Dec. 11, 1994; 22(24):5456-65.
Haugland, Richard P. *The handbook: a guide to fluorescent probes and labeling technologies*. Molecular probes, 2005. TOC Only.
Hutvagner et al., "A cellular function for the RNA-interference enzyme Dicer in the maturation of the let-7 small temporal RNA." Science. Aug. 3, 2001; 293(5531):834-8.
Iorio et al., "MicroRNA dysregulation in cancer: diagnostics, monitoring and therapeutics. A comprehensive review." EMBO Mol Med. Mar. 2012; 4(3):143-59.
Johnson-Buck et al., "Kinetic fingerprinting to identify and count single nucleic acids." Nat Biotechnol. Jul. 2015;33(7):730-2.
Johnson-Buck et al., "Super-resolution fingerprinting detects chemical reactions and idiosyncrasies of single DNA pegboards." Nano Lett. Feb. 13, 2013;13(2):728-33.
Jungmann et al., "Single-molecule kinetics and super-resolution microscopy by fluorescence imaging of transient binding on DNA origami." Nano Lett. Nov. 10, 2010;10(11):4756-61.
Ketting et al., "Dicer functions in RNA interference and in synthesis of small RNA involved in developmental timing in C. elegans." Genes Dev. Oct. 15, 2001; 15(20):2654-9.
Khvorova et al., "Functional siRNAs and miRNAs exhibit strand bias." Cell. Oct. 17, 2003; 115(2):209-16.
Lagos-Quintana et al., "Identification of tissue-specific microRNAs from mouse." Curr Biol. Apr. 30, 2002; 12(9):735-9.
Lau et al., "An abundant class of tiny RNAs with probable regulatory roles in Caenorhabditis elegans." Science. Oct. 26, 2001; 294(5543):858-62.
Lee et al., "An Extensive Class of Small RNAs in Caenorhabditis elegans" Science, Oct. 26, 2001, 294:862-864.
Lee et al., "MicroRNA maturation: stepwise processing and subcellular localization." EMBO J. Sep. 2, 2002; 21(17):4663-70.
Lehninger et al., Principles of Biochemistry, Worth Pub. 1982, pp. 793-800.
Lin et al., "Synthesis of oligodeoxyribonucleotides containing degenerate bases and their use as primers in the polymerase chain reaction." Nucleic Acids Res. Oct. 11, 1992; 20(19):5149-52.
Lin et al., "Synthesis and duplex stability of oligonucleotides containing cytosine-thymine analogues." Nucleic Acids Res. Dec. 25, 1989; 17(24):10373-83.
Marek et al., "The shape-shifting quasispecies of RNA: one sequence, many functional folds." Phys Chem Chem Phys. Jun. 28, 2011;13(24):11524-37.
Marmur et al, "Strand Separation and Specific Recombination in Deoxyribonucleic Acids: Biological Studies." Proc Natl Acad Sci U S A. Apr. 1960; 46(4):453-61.
McKinney et al., "Structural dynamics of individual Holliday junctions." Nat Struct Biol. Feb. 2003;10(2):93-7.

Mead et al., *Introduction to VLSI systems*. vol. 802. Reading, MA: Addison-Wesley, 1980.
Michelotti et al., "A bird's eye view tracking slow nanometer-scale movements of single molecular nano-assemblies." Methods Enzymol. 2010; 475:121-48.
Mitchell et al., "Circulating microRNAs as stable blood-based markers for cancer detection." Proc Natl Acad Sci U S A. Jul. 29, 2008; 105(30):10513-8.
Nasef et al., "Melting temperature of surface-tethered DNA." Anal Biochem. Nov. 1, 2010;406(1):34-40.
Ostergaard et al., "Pyrene-functionalized oligonucleotides and locked nucleic acids (LNAs): tools for fundamental research, diagnostics, and nanotechnology." Chem Soc Rev. Dec. 2011; 40(12):5771-88.
Palau et al., "Single-cycle kinetic analysis of ternary DNA complexes by surface plasmon resonance on a decaying surface." Biochimie. Sep. 2012;94(9):1891-9.
Parajape et al., "MicroRNAs: tools for cancer diagnostics" Gut. Nov. 2009; 58(11):1546-1554.
Park et al. "Kinetic and affinity analyses of hybridization reactions between peptide nucleic acid probes and DNA targets using surface plasmon field-enhanced fluorescence spectroscopy" Biointerphases. Dec. 2006;1(4):113-22.
Pasquinelli et al., "Conservation of the sequence and temporal expression of let-7 heterochronic regulatory RNA." Nature. Nov. 2, 2000; 408(6808):86-9.
Paul et al., "Effective expression of small interfering RNA in human cells." Nat Biotechnol. May 2002;20(5):505-8.
Piliarik et al., "Direct optical sensing of single unlabelled proteins and super-resolution imaging of their binding sites." Nat Commun. Jul. 29, 2014; 5:4495.
Schwarzenbach et al., "Cell-free nucleic acids as biomarkers in cancer patients." Nat Rev Cancer. Jun. 2011; 11(6):426-37.
Schweitzer et al., "Hydrophobic, Non-Hydrogen-Bonding Bases and Base Pairs in DNA." J Am Chem Soc. Feb. 22, 1995; 117(7):1863-1872.
Schweitzer et al., "Aromatic Nonpolar Nucleosides as Hydrophobic Isosteres of Pyrimidine and Purine Nucleosides." J Org Chem. Dec. 1, 1994;59(24):7238-7242.
Search Report of related EP 15832556.3, mailed Feb. 13, 2018, 12 pages.
Selleck et al., "Biophysical Characterization and Direct Delivery of S. pyogenesCas9 Ribonucleoprotein Complexes" Mol Ther, Apr. 27, 2015 (Apr. 27, 2015), vol. 23, Suppl. 1, p. S66.
Solomatin et al., "Multiple native states reveal persistent ruggedness of an RNA folding landscape." Nature. Feb. 4, 2010;463(7281):681-4.
Stahlhut et al., "MicroRNAs and the cancer phenotype: profiling, signatures and clinical implications." Genome Med. Dec. 30, 2013; 5(12):111.
Sui et al., "An ultra-sensitive DNA assay based on single-molecule detection coupled with hybridization accumulation and its application." Analyst. Oct. 7, 2011; 136(19):3950-5.
Sze, *VLSI technology*, McGraw-Hill, 1983, TOC only.
Tan et al., "Molecular beacons." Curr Opin Chem Biol. Oct. 2004; 8(5):547-53.
Taton et al., "Scanometric DNA array detection with nanoparticle probes." Science. Sep. 8, 2000;289(5485):1757-60.
Trcek et al., "Single-mRNA counting using fluorescent in situ hybridization in budding yeast." Nat Protoc. Feb. 2, 2012; 7(2):408-19.
Xie et al., "miRCancer: a microRNA-cancer association database constructed by text mining on literature." Bioinformatics. Mar. 1, 2013; 29(5):638-44.
Zhang et al., "Optimizing the specificity of nucleic acid hybridization." Nat Chem. Jan. 22, 2012; 4(3):208-14.
Zhuang et al., "Correlating Structural Dynamics and Function in Single Ribozyme Molecules" Science. May 24, 2002;296(5572):1473-6.
International Search Report for PCT/2015/044650 dated Dec. 29, 2015, 17 pages.
International Search Report of PCT PCT/US2017/016977, mailed Apr. 25, 2017, 19 pages.

(56) References Cited

OTHER PUBLICATIONS

Alberts, "Efficient separation of single-stranded and double-stranded deoxyribonucleic acid in a dextran-polyethylene glycol two-phase system." Biochemistry. Aug. 1967;6(8):2527-32.

Albertsson, Walter, "Partitioning in Aqueous Two—Phase System", Theory, Methods, Uses, and Applications to Biotechnology. Elsevier 2012, Index only.

Alves et al., "Aqueous Two-Phase Systems of Poly(ethylene glycol) and Sodium Citrate: Experimental Results and Modeling", J. Chem. Eng. 2008; 53(7):1587-1594.

Azevedo et al., "Partitioning of human antibodies in polyethylene glycol-sodium citrate aqueous two-phase systems", Separation and Purification Technology. 2009; 65(1):14-21.

Blanco et al., "Analysis of complex single-molecule FRET time trajectories", Methods Enzymol. 2010; 472:153-78.

Brunette et al., "A rapid method for the isolation of L-cell surface membranes using an aqueous two-phase polymer system." J Membr Biol. Sep. 1971;5(3):215-24.

Frampton et al., "Aqueous two-phase system patterning of detection antibody solutions for cross-reaction-free multiplex ELISA." Sci Rep. 2014; 4:4878.

Gomes et al., "Purification of plasmid DNA with aqueous two phase systems of PEG 600 and sodium citrate/ammonium sulfate", Separation and Purification Technology. 2009; 65(1):22-30.

Gündüz et al., "Bovine serum albumin partitioning in an aqueous two-phase system: effect of pH and sodium chloride concentration", J Chromatogr B Biomed Sci Appl. 2000 23;743(1-2):255-8.

Hatti-Kaul, "Aqueous two-phase systems. A general overview." Mol Biotechnol. 2001; 19(3):269-77.

Hayward et al. "Ultraspecific and Amplification-Free Quantification of Mutant DNA by Single-Molecule Kinetic Fingerprinting." J Am Chem Soc. Sep. 19, 2018;140(37):11755-11762.

Iqbal et al., "Aqueous two-phase system (ATPS): an overview and advances in its applications", Biological Procedures Online 2016 18:18.

Jia et al., "Rapid RNA exchange in aqueous two-phase system and coacervate droplets", Orig Life Evol Biosph. 2014; 44(1):1-12. doi: 10.1007/s11084-014-9355-8.

Kulkarni, "Digital multiplexed gene expression analysis using the NanoString nCounter system", Curr Protoc Mol Biol. 2011 ;Chapter 25:Unit25 B.10.

Lantz et al., "Enhanced sensitivity in PCR detection of Listeria monocytogenes in soft cheese through use of an aqueous two-phase system as a sample preparation method." Appl Environ Microbiol. 1994; 60(9): 3416-3418.

Larkin et al., "Length-independent DNA packing into nanopore zero-mode waveguides for low-input DNA sequencing.", Nat Nanotechnol. Dec. 2017;12(12):1169-1175. doi: 10.1038/nnano.2017.176. Epub Sep. 11, 2017.

Larkin et al., "Reversible Positioning of Single Molecules inside Zero-Mode Waveguides", Nano Lett. 2014; 14(10): 6023-6029.

Luechau et al."Primary capture of high molecular weight nucleic acids using aqueous two-phase systems" Separation and Purification Technology 66 (2009) 202-207.

Luechau et al., "Selective partition of plasmid DNA and RNA from crude *Escherichia coli* cell lysate by aqueous two-phase systems" Biochemical Engineering Journal vol. 55, Issue 3, p. 230-232, 2011.

Mattiasson, "Applications of aqueous two-phase systems in biotechnology", Trends in Biotechnology. 1983; 1(1):16-20.

Munir et al., "Modeling Hybridization Kinetics of Gene Probes in a DNA Biochip Using FEMLAB." Microarrays (Basel). May 29, 2017;6(2). 12 pages.

Nazer et al., "Partitioning of pyrimidine single stranded oligonucleotide using polyethylene glycol—sodium sulfate aqueous two-phase systems; experimental and modeling", Fluid Phase Equilibria. 2017; 432:45-53.

Persson et al., "Aqueous polymer two-phase systems formed by new thermoseparating polymers", Bioseparation. 2000; 9(2):105-116.

Philipson et al., "The purification and concentration of viruses by aqueous polymer phase systems", Virology. 1960; 11(3):553-571.

Rissin et al., "Single-molecule enzyme-linked immunosorbent assay detects serum proteins at subfemtomolar concentrations", Nat Biotechnol. 2010 ; 28(6):595-9. doi: 10.1038/nbt.1641.

Schulze et al., "Navigating gene expression using microarrays—a technology review", Nat Cell Biol. 2001; 3(8):E190-5.

Su et al., "Single-Molecule Counting of Point Mutations by Transient DNA Binding", Scientific Reports. 2017; 7:43824.

Walter et al., "Hydrophobic affinity partition in aqueous two-phase systems containing poly(ethylene glycol)-palmitate of rightside-out and inside-out vesicles from human erythrocyte membranes", FEBS Lett. 1976; 61(2):209-3.

Search Report of related EP 15832556.3, mailed Nov. 15, 2018, 13 pages.

Search Report of related EP 17750678.9, mailed Sep. 12, 2019, 8 pages.

International Search Report of PCT/US2019/043022, mailed Oct. 28, 2019, 14 pages.

Barrangou et al., "CRISPR provides acquired resistance against viruses in prokaryotes." Science. Mar. 23, 2007;315(5819):1709-12.

Chylinski et al. "The tracrRNA and Cas9 families of type II CRISPR-Cas immunity systems." RNA Biol. May 2013;10(5):726-37.

Cohen et al., "Digital direct detection of microRNAs using single molecule arrays." Nucleic Acids Res. Aug. 21, 2017;45(14):e137.

Cong et al., "Multiplex genome engineering using CRISPR/Cas systems." Science. Feb. 15, 2013;339(6121):819-23.

Domagala et al., "KRAS mutation testing in colorectal cancer as an example of the pathologist's role in personalized targeted therapy: a practical approach." Pol J Pathol. Nov. 2012;63(3):145-64.

Doudna et al., "Genome editing. The new frontier of genome engineering with CRISPR-Cas9." Science. Nov. 28, 2014;346, 10 pages.

Esvelt et al., "Orthogonal Cas9 proteins for RNA-guided gene regulation and editing." Nat Methods. Nov. 2013;10(11):1116-21.

Fonfara et al., "Phylogeny of Cas9 determines functional exchangeability of dual-RNA and Cas9 among orthologous type II CRISPR-Cas systems" Nucleic Acids Res. Feb. 2014; 42(4): 2577-2590.

Gerecke et al., "Ultrasensitive detection of unknown colon cancer-initiating mutations using the example of the Adenomatous polyposis *coli* gene." Cancer Prev Res (Phila). Sep. 2013;6(9):898-907.

Jinek et al., "A programmable dual-RNA-guided DNA endonuclease in adaptive bacterial immunity." Science. Aug. 17, 2012;337(6096):816-21.

Jungmann et al., "Quantitative super-resolution imaging with qPAINT." Nat Methods. May 2016;13(5):439-42.

Kleinstiver et al., "High-fidelity CRISPR-Cas9 nucleases with no detectable genome-wide off-target effects." Nature. Jan. 28, 2016;529(7587):490-5.

Lee et al., "The Neisseria meningitidis CRISPR-Cas9 System Enables Specific Genome Editing in Mammalian Cells." Mol Ther. Mar. 2016;24(3):645-54.

Maniatis, et al. (1982) Molecular Cloning: A Laboratory Manual, Cold Spring Harbor, N.Y. (see, e.g., pp. 280-281).

Needleman et al. "A general method applicable to the search for similarities in the amino acid sequence of two proteins." J Mol Biol. Mar. 1970;48(3):443-53.

Nishimasu et al., "Crystal structure of Cas9 in complex with guide RNA and target DNA." Cell. Feb. 27, 2014;156(5):935-49.

O'Connell et al., "Programmable RNA recognition and cleavage by CRISPR/Cas9." Nature. Dec. 11, 2014;516(7530):263-6.

Qi et al., "Repurposing CRISPR as an RNA-guided platform for sequence-specific control of gene expression." Cell. Feb. 28, 2013;152(5):1173-83.

Ran et al., "In vivo genome editing using *Staphylococcus aureus* Cas9." Nature. Apr. 9, 2015;520(7546):186-91.

Slaymaker et al., "Rationally engineered Cas9 nucleases with improved specificity." Science. Jan. 1, 2016;351(6268):84-8.

Walter et al., "Do-it-yourself guide: how to use the modern single-molecule toolkit." Nat Methods. Jun. 2008;5(6):475-89.

(56) References Cited

OTHER PUBLICATIONS

Wang et al., "A dynamic sandwich assay on magnetic beads for selective detection of single-nucleotide mutations at room temperature." Biosens Bioelectron. Aug. 15, 2017; 94:305-311.

Zhang et al., "Processing-independent CRISPR RNAs limit natural transformation in Neisseria meningitidis." Mol Cell. May 23, 2013;50(4):488-503.

International Search Report of PCT PCT/US2018/021356, mailed May 25, 2018, 8 pages.

Written Opinion of PCT PCT/US2018/021356, mailed May 25, 2018, 9 pages.

EP Search Report of related EP Application No. 19840932.8, mailed Mar. 10, 2022, 9 pages.

Chatterjee et al., Supplemental Information for "Direct kinetic fingerprinting and digital counting of single protein molecules" Proceedings of the National Academy of Sciences Sep. 2020, 1-20.

Chatterjee et al., "Ultraspecific analyte detection by direct kinetic fingerprinting of single molecules", Trends in analytical chemistry : 2020 TRAC, 123, 115764.

Fu et al., "Multi-enzyme complexes on DNA scaffolds capable of substrate channelling with an artificial swinging arm". Nature nanotechnology. Jul. 2014;9(7):531-6.

Hayward et al. Supplemental Information "Ultra specific and Amplification-Free Quantification of Mutant DNA by Single-Molecule Kinetic Fingerprinting." J Am Chem Soc. 2018, 1-30.

Johnson-Buck et al., Supplemental Information "Kinetic fingerprinting to identify and count single nucleic acids." Nat Biotechnol. 2015, 1-15.

Johnson-Buck et al., "A guide to nucleic acid detection by single-molecule kinetic fingerprinting". Methods , 2019, 153, 3-12.

Khanna et al., "Rapid kinetic fingerprinting of single nucleic acid molecules by a FRET-based dynamic nanosensor", 2021 Biosensors & bioelectronics, 190, 113433.

Li et al., "Automatic classification and segmentation of single-molecule fluorescence time traces with deep learning", 2020 Nature communications, 1-11(1), 5833.

Li et al., Supplementary Information "Automatic classification and segmentation of single-molecule fluorescence time traces with deep learning", 2020 Nature communications 1-19.

Mandal et al., "A guide to accelerated direct digital counting of single nucleic acid molecules by FRET-based intramolecular kinetic fingerprinting", 2022 Methods 197, 63-73.

Weng et al., "Single-Molecule Kinetic Fingerprinting for the Ultrasensitive Detection of Small Molecules with Aptasensors". Analytical chemistry, 2019, 91(2), 1424-143.

Jungmann et al. "Multiplexed 3D Cellular Super-Resolution Imaging with DNA-Paint and Exchange-Paint." Nat Methods. Mar. 2014;11(3):313-8.

Raab et al. Fluorescense microscopy with 6nm resolution on DNA origami. Chemphyschem. Aug. 25, 2014;15(12):2431-5.

Dai et al. Optical Imaging of indivisual biomolecules in densely packed clusters. Nat Nanotechnol. Sep. 2016;11(9):798-807.

El-Sagheer et al: "Click Nucleic Acid Ligation: Applications in Biology and Nanotechnology", Accounts of Chemical Research, vol. 45, No. 8, Aug. 21, 2012 (Aug. 21, 2012), pp. 1258-1267.

Shelbourne, M. et al: "Fast copper-free click DNA ligation by the ring-strain promoted alkyne-azide cycloaddition reaction", Chemical Communications, vol. 47, No. 22, Jan. 1, 2011, p. 6257.

Bishop C.M., "Pattern Recognition and Machine Learning," Springer, TOC only, 2006, 10 Pages.

Blouin S., et al., "Functional Studies of DNA-Protein Interactions Using FRET Techniques," Methods in Molecular Biology, DNA-Protein Interactions, 2009, vol. 543, pp. 475-502, Published Online Jan. 1, 2009.

Chen Y., et al., "Click Chemistry-Mediated Nanosensors for Biochemical Assays," Theranostics, 2016, vol. 6, Issue 7, pp. 969-985, (Published Apr. 28, 2016).

Dahan L., et al., "SNP Detection in mRNA in Living Cells Using Allele Specific FRET Probes," PLOS ONE, Sep. 2013, vol. 8, Issue No. 9, 11 Pages.

Jing C., et al., "A Microfluidic Multiplex Proteomic Immunoassay Device for Translational Research," Clinical Proteomics, US, Dec. 1, 2015 , vol. 12, No. 1, DOI: 10.1186/s12014-015-9101-x, ISSN: 1542-6416, XP093134907, (See Abstract, p. 2, 4 and Tables 1-2).

Lakowicz J.R., et al., "Quenching of Fluorescence," Principles of Fluorescence Spectroscopy, Chapter 8, Springer New York, NY, Sep. 15, 2006, pp. 277-330.

Landry J.P., et al., "Measuring Affinity Constants of 1450 Monoclonal Antibodies to Peptide Targets With a Microarray-Based Label-Free Assay Platform," Journal of Immunological Methods, Feb. 2015, vol. 417, pp. 86-96.

Tanmay C., et al., "Highly Sensitive Protein Detection by Aptamer-based Single-molecule Kinetic Fingerprinting," Biosensors and Bioelectronics, Amsterdam, NL, Nov. 1, 2022, vol. 216, p. 114639, DOI: 10.1016/j.bios.2022.114639, ISSN: 0956-5663, XP093019113, Retrieved from URL: https://www.sciencedirect.com/science/article/pii/S0956566322006790/pdfft?md5=a05391f36744924026d35d6f2cd3f52d&pid=1-s2.0-S0956566322006790-main.pdf.

Walter H., et al., "Partitioning in Aqueous Two-phase System", Theory, Methods, Uses, and Applications to Biotechnology, Elsevier, 1985, pp. 677-704 (30 Pages), Index only.

Aitken et al., An oxygen scavenging system for improvement of dye stability in single-molecule fluorescence experiments. Biophys J. Mar. 1, 2008;94(5):1826-35.

Arnheim et al. Polymerase chain reaction strategy. Annu Rev Biochem. 1992;61:131-56.

Blackwell et al., Differences and similarities in DNA-binding preferences of MyoD and E2A protein complexes revealed by binding site selection. Science. Nov. 23, 1990;250(4984):1104-10.

Boutorine, A.S. et al. Flourescent Probes for Nucleic Acid Visualizaiton in Fixed and Live Cells. Mol. 2013, 18; 15357-97.

Brody et al., Life's simple measures: unlocking the proteome. J Mol Biol. Oct. 5, 2012;422(5):595-606.

Bronson et al., Learning rates and states from biophysical time series: a Bayesian approach to model selection and single-molecule FRET data. Biophys J. Dec. 16, 2009;97(12):3196-205.

Chung et al., Fluorogenic DNA-PAINT for faster, low-background super-resolution imaging. Nat Methods. May 2022;19(5):554-559.

Dai et al. Optical Imaging of individual biomolecules in densely packed clusters. Nature Nanotech, 2016; 11(9), 798-807.

Dey et al., An aptamer that neutralizes R5 strains of human immunodeficiency virus type 1 blocks gp120-CCR5 interaction. J Virol. Nov. 2005;79(21):13806-10.

Ellington et al., In vitro selection of RNA molecules that bind specific ligands. Nature. Aug. 30, 1990;346(6287):818-22.

Extended European Search Report for EP App. No. 22177454.0, mailed Nov. 22, 2022, 15 pages.

Forbes et al. Engineering and analysis of surface interactions in a microfluidic herringbone micromixer. Lab Chip. Aug. 7, 2012;12(15):2634-7.

Geekiyanage et al., Extracellular microRNAs in human circulation are associated with miRISC complexes that are accessible to anti-AGO2 antibody and can bind target mimic oligonucleotides. Proc Natl Acad Sci U S A. Sep. 29, 2020;117(39):24213-24223.

Gold et al., Aptamer-based multiplexed proteomic technology for biomarker discovery. PLoS One. Dec. 7, 2010;5(12):e15004. 1-17.

Gold. Selex: How It Happened and Where It will Go. J Mol Evol. Dec. 2015;81(5-6):140-3.

Grushka et al., Diffusion in liquids. II. The dependence of the diffusion coefficients on molecular weight and on temperature. J. Am. Chem. Soc. 1976,98,3,643-648.

Hathout et al., Large-scale serum protein biomarker discovery in Duchenne muscular dystrophy. Proc Natl Acad Sci U S A. Jun. 9, 2015;112(23):7153-8.

Hwang et al., Protein induced fluorescence enhancement (PIFE) for probing protein-nucleic acid interactions. Chem Soc Rev. Feb. 21, 2014;43(4):1221-9.

Jungmann et al. "Multiplexed 3D Cellular Super-Resolution Imaging with DNA-PAINT and Exchange-PAINT." Nature Methods, 11(3), 2014; 313-318.

Lee et al., Aptamer therapeutics advance. Curr Opin Chem Biol. Jun. 2006;10(3):282-9.

(56) References Cited

OTHER PUBLICATIONS

Merck-Millipore, "Microfluidic perfusion enables long-term cell culture, precise microenviornment control and gene expression analysis", 2014).

Office Action for CN App. No. 201880030752.9, mailed Oct. 9, 2022, 16 pages.

Office Action for CN App. No. 201880089480.X, mailed Nov. 8, 2022, 10 pages. With English Translation.

Office Action for JP App. No. 2019-549000, mailed on Feb. 8, 2022, 2 pages.

Office Action for JP App. No. 2021-087225, mailed Jan. 17, 2023, 4 pages.

Office Action for JP App. No. 2021-087225, mailed Jul. 12, 2022, 5 pages.

Office Action of JP App. No. 2020-532561, mailed Sep. 20, 2022, 4 pages.

Office Action of JP App. No. 2021-504244, mailed Jun. 6, 2023, 5 pages.

Office Action of CN 201980062754.0, mailed Aug. 2, 2023, 7 pages.

Pos et al., Circulating cell-free nucleic acids: characteristics and applications. Eur J Hum Genet. Jul. 2018;26(7):937-945.

Raab et al. Fluorescense microscopy with 6nm resolution on DNA origami. Chem Phys Chem, 2014; 15(12), 2431-35.

Ruckman et al., 2'-Fluoropyrimidine RNA-based aptamers to the 165-amino acid form of vascular endothelial growth factor (VEGF165). Inhibition of receptor binding and VEGF-induced vascular permeability through interactions requiring the exon 7-encoded domain. J Biol Chem. Aug. 7, 1998;273(32):20556-67.

Sung et al., Inhibition of human neutrophil activity by an RNA aptamer bound to interleukin-8. Biomaterials. Jan. 2014;35(1):578-89.

Thales Visionix Inc. v US 850 F. 3D 1343; retrieved from the Internet: <URL: https://www.bitlaw.com/source/cases/patent/Thales-Visionix.html> Mar. 8, 2017.

Thanasupawat et al., Slow Off-Rate Modified Aptamer (SOMAmer) Proteomic Analysis of Patient-Derived Malignant Glioma Identifies Distinct Cellular Proteomes. Int J Mol Sci. Sep. 3, 2021;22(17):9566. 1-24.

Walter, "Partitioning in Aqueous Two-Phase System", Theory, Methods, Uses, and Applications to Biotechnology. Elsevier 1986, Index only.

Wen D. et al. DNA based click polymerization for ultrasensitive IFN-γ fluorescent detection. Sensors and Actuators B: Chemical, vol. 276, Dec. 10, 2018, pp. 279-28.

Wright et al., Cyclic amplification and selection of targets (CASTing) for the myogenin consensus binding site. Mol Cell Biol. Aug. 1991;11(8):4104-10.

U.S. Appl. No. 63/389,406, filed Jul. 15, 2022, Chatterjee.

* cited by examiner

PROTEIN ANALYTE DETECTION BY ANALIZING TIME-DEPENDENT SIGNALS FROM TRANSIENT BINDING EVENTS OF LABELED LOW-AFFINITY PROBES

This application claims priority to U.S. provisional patent application Ser. No. 62/468,578, filed Mar. 8, 2017, which is incorporated herein by reference in its entirety.

STATEMENT REGARDING FEDERALLY SPONSORED RESEARCH OR DEVELOPMENT

This invention was made with government support under grant GM062357 awarded by the U.S. National Institutes of Health, and under grant W911NF-12-1-0420 awarded by the U.S. Navy, Office of Naval Research. The government has certain rights in the invention.

FIELD

Provided herein is technology relating to the detection of analytes and particularly, but not exclusively, to methods, systems, compositions, and kits for detecting analytes such as nucleic acids, proteins, small molecules, and other molecules using a technology based on the transient binding of detection probes.

BACKGROUND

Detecting and quantifying low-concentration analytes in complex mixtures has numerous applications in biological research and clinical diagnostics. Many important biological analytes are biomarkers of disease and other biological states. For example, the detection of a small fraction of circulating nucleic acids bearing oncogenic mutations in blood, urine, saliva, and other body fluids has been correlated to the incidence of certain types of cancer. In addition, protein analytes such as prostate-specific antigen (PSA) and interleukins also have current or potential clinical and research significance. The levels of small molecule metabolites provide information about health and drug processing in a biological system. Antibodies, aptamers, nucleic acids, and other affinity reagents are widely used for these assays in molecular diagnostics and research.

A challenge in the detection of low-abundance molecular analytes is the trade-off between sensitivity and specificity. That is, as the sensitivity of an assay is increased, the potential for false positives is increased, which reduces specificity. For instance, false positives in common ELISA (enzyme-linked immunosorbent assay) methods result from nonspecific binding of primary or secondary antibodies to the assay surface, thus producing a signal when the intended target analyte is not present. In such cases, improving detector sensitivity or signal amplification efficiency increases both true positive and false positive detection events, resulting in lower specificity. While strategies have been developed to reduce false positive events, including incubation of surfaces with blocking solutions, stringent washing protocols, and use of split probes that must jointly bind a target analyte to generate a signal, current approaches nonetheless suffer from false positives because the false positive signal cannot be completely eliminated in practice. As a result, detecting target analytes at the single-molecule level with high specificity remains elusive for many classes of biomarkers.

SUMMARY

Previously, a strategy for detecting nucleic acids using kinetic modeling and analysis of intensity vs. time data for transient binding of a query probe has been described (see Johnson-Buck et al. (2015) Nat. Biotechnol. 33: 730-32; U.S. Pat. App. Pub. No. 20160046988; Int'l Pat. App. No. PCT/US2017/016977, each of which is incorporated herein by reference in its entirety). In contrast, the present technology provides in some embodiments a new method for detecting target analytes bound stably to a surface by determining the spatial and temporal coordinates of each binding and dissociation event of a low-affinity query probe, then clustering binding events by position, and subjecting each cluster event to a kinetic analysis (e.g., determining the mean, median, maximum, minimum, standard deviation, or other metrics of dwell times between events or number of events per target molecule per unit time). This method permits discrimination between nonspecific probe binding and binding of the probe to the target analyte because the accumulation of position-vs-time statistics over multiple binding events of a query probe to a single target analyte yields greater confidence in the identity of the analyte than any of the following: a single binding event, a cumulative count of binding events across an observation area, or a cumulative count of probe signal across an observation area. Moreover, the method uses spatial position information and clustering based on intensity fluctuations (rather than overall signal intensity) to surpass the resolution limits of the detection apparatus to provide "super-resolution" measurements. Accordingly, in some embodiments the technology provides a higher dynamic range than previously published methods (FIG. 2) and improved discrimination of specific binding to a target analyte from nonspecific binding of detection probes to the imaging surface or other surface-bound analytes (FIG. 3). In particular, a tightly clustered spatial localization of signals from target binding and distinct kinetic behavior of probe binding to target are used to provide improved discrimination of target signal from nonspecific (e.g., false positive) signal. In some embodiments, when applied to query probe binding events over a large detector area, the method finds use in digitally counting one or more target analytes at the level of single molecules.

The technology provides advantages over prior technologies including, but not limited to, improved discrimination of analyte relative to background binding, improved discrimination between closely related analytes, and analysis of very dilute or low-volume specimens (e.g., with improved sensitivity and/or specificity relative to prior technologies for analysis of the same analytes).

Accordingly, in some embodiments the technology provides a method of characterizing an analyte in a sample.

The technology is not limited in the analyte that is detected. For example, embodiments provide for detection of an analyte that is a nucleic acid, a polypeptide, a carbohydrate, a polysaccharide, a fatty acid, a phospholipid, a glycolipid, a sphingolipid, a small molecule, a metabolite, a cofactor, etc.

In some embodiments, the query and/or capture probe is a nucleic acid, a polypeptide (e.g., an antibody, antibody fragment, linear antibody, single-chain antibody, or other antigen-binding antibody derivative; an enzyme; a binding protein that recognizes the analyte with specificity); in some embodiments in which the analyte comprises a carbohydrate or polysaccharide, the query probe comprises a carbohydrate-binding protein such as a lectin or a carbohydrate-binding antibody. In some embodiments, the presence of a specific glycosidic linkage or set of glycosidic linkages between carbohydrate monomers yields a distinguishable pattern of query probe binding. In some embodiments, the capture probe is a rabbit monoclonal antibody; and in some embodiments, the query probe is a mouse monoclonal antibody.

For example, in some embodiments the method comprises recording a time-dependent signal of query probe events for analytes immobilized to a surface as a function of (x, y) position on the surface; clustering events into local clusters by (x, y) position; and calculating a kinetic parameter for each event cluster to characterize the analyte. In some embodiments, the surface is a solid support. In some embodiments, the surface is diffusible. In some embodiments, recording a time-dependent signal of query probe events comprises measuring the signal for an analyte with single-molecule sensitivity. In some embodiments, methods further comprise calculating a differential intensity map comprising the time-dependent signal intensity changes at the surface as a function of (x, y) position. In some embodiments, (x, y) position is determined with sub-pixel accuracy.

In some embodiments, clustered events represent binding events for a single analyte molecule. In some embodiments, characterizing the analyte comprises indicating the presence, absence, concentration, or number of the analyte in the sample. In some embodiments, the analyte comprises a polypeptide. In some embodiments, the method indicates the presence or absence of a post-translational modification on the polypeptide. In some embodiments, the post-translational modification mediates a transient association of the query probe with the polypeptide. In some embodiments, a chemical affinity tag mediates a transient association between the post-translational modification and the query probe. In some embodiments, the chemical affinity tag is a nucleic acid. In some embodiments, the analyte is a nucleic acid. In some embodiments, a transient association of the query probe with the analyte is distinguishably affected by a covalent modification of the analyte. In some embodiments, the query probe is a nucleic acid or aptamer. In some embodiments, the query probe is a low-affinity antibody, an antibody fragment, or a nanobody. In some embodiments, the query probe is a DNA-binding protein, an RNA-binding protein, or a DNA-binding ribonucleoprotein complex.

In some embodiments, the (x, y) position of each query probe event is determined by processing the differential intensity profile using centroid determination, least-squares fitting to a Gaussian function, least squares fitting to an Airy disk function, least-squares fitting to a polynomial function (e.g., a parabola), or maximum likelihood estimation. In some embodiments, the analyte is subjected to thermal denaturation in the presence of a carrier prior to surface immobilization. In some embodiments, the analyte is subjected to chemical denaturation in the presence of a carrier prior to surface immobilization, e.g., the analyte is denatured with a denaturant such as urea, formamide, guanidinium chloride, high ionic strength, low ionic strength, high pH, low pH, or sodium dodecyl sulfate (SDS).

Further embodiments provide a system for quantifying an analyte in a sample. For example in some embodiments, systems comprise a functionality to stably immobilize an analyte to a surface; a freely diffusing query probe that binds to the target analyte with a low affinity; and a detection system that records query probe events and the spatial position of query probe events for analytes. In some embodiments, systems further comprise analytical procedures to identify an individual molecular copy of the target analyte according to the spatial position and timing of repeated binding and dissociation events to said target analyte. In some embodiments, the query probe is a nucleic acid or aptamer. In some embodiments, the query probe is a low-affinity antibody, an antibody fragment, or a nanobody. In some embodiments of systems, the query probe and/or the capture probe is a DNA-binding protein, an RNA-binding protein, or a DNA-binding ribonucleoprotein complex. In some embodiments, the query and/or capture probe is a nucleic acid, a polypeptide (e.g., an antibody, antibody fragment, linear antibody, single-chain antibody, or other antigen-binding antibody derivative; an enzyme; a binding protein that recognizes the analyte with specificity); in some embodiments in which the analyte comprises a carbohydrate or polysaccharide, the query probe comprises a carbohydrate-binding protein such as a lectin or a carbohydrate-binding antibody. In some embodiments, the presence of a specific glycosidic linkage or set of glycosidic linkages between carbohydrate monomers yields a distinguishable pattern of query probe binding. In some embodiments, the capture probe is a rabbit monoclonal antibody; and in some embodiments, the query probe is a mouse monoclonal antibody.

In some system embodiments, the analyte is stably immobilized to the surface by a surface-bound capture probe that stably binds the target analyte. In some embodiments, the capture probe is a high-affinity antibody, an antibody fragment, or a nanobody. In some embodiments, the analyte is stably immobilized to the surface by a covalent bond cross-linking the target analyte to the surface. In some embodiments, the analyte is subjected to thermal denaturation in the presence of a carrier prior to surface immobilization. In some embodiments, the analyte is subjected to chemical denaturation in the presence of a carrier prior to surface immobilization, e.g., the analyte is denatured with a denaturant such as urea, formamide, guanidinium chloride, high ionic strength, low ionic strength, high pH, low pH, or sodium dodecyl sulfate (SDS). Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings:

FIG. 3A shows significant positive signal from the target analyte. Due to the specificity of the method, there was no target analyte signal detected in FIG. 3B. The experiment indicates the high specificity of embodiments of the technology described herein.

Figure 1:
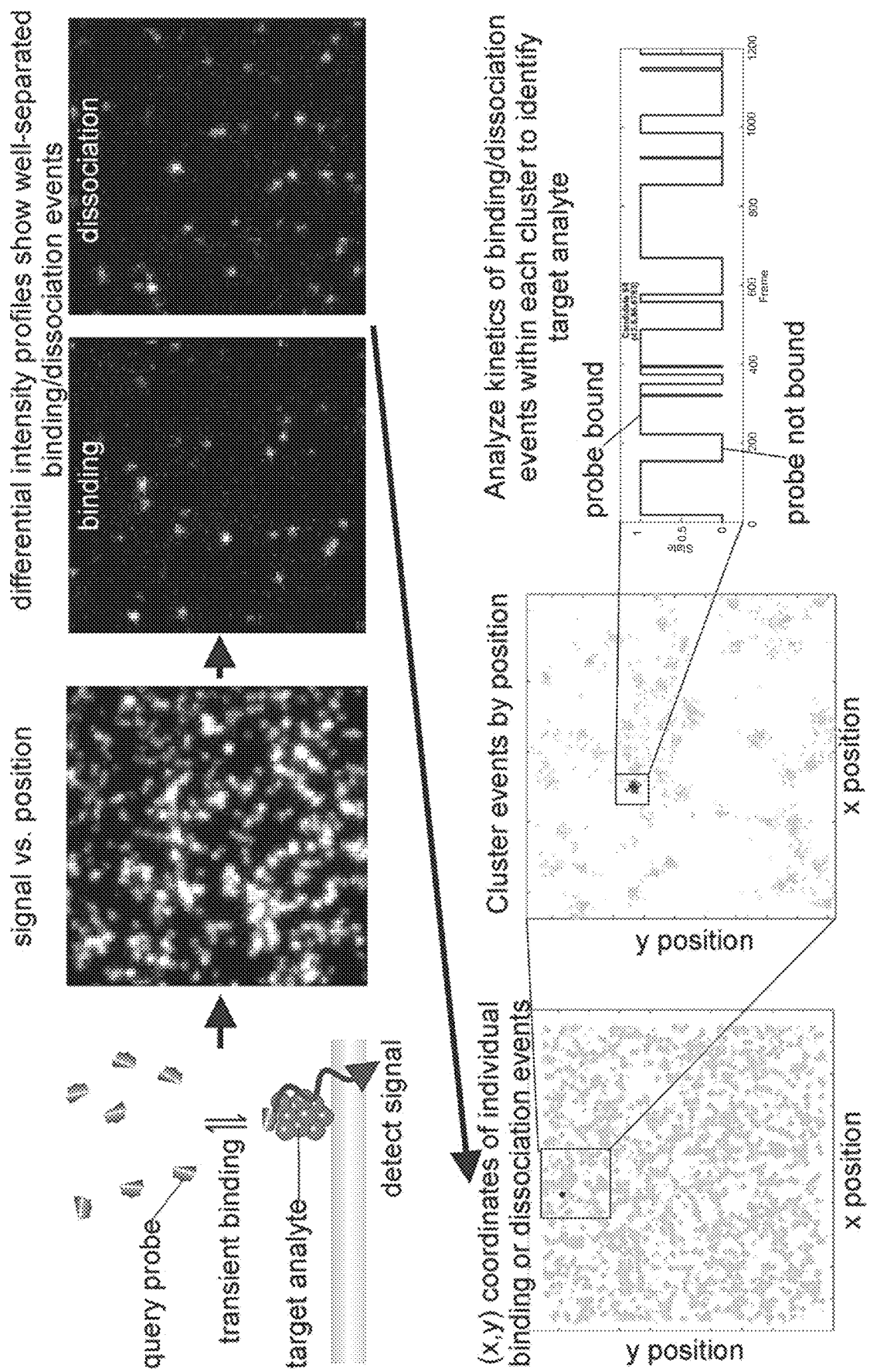
FIG. 1 is schematic drawing showing steps of a method embodiment of the technology described herein and experimental data collected during the development of embodiments of the technology described herein.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

In some embodiments, the technology provided herein relates to detecting biomolecular analytes with transient (e.g., kinetic), rather than stable (equilibrium, thermodynamic), interactions with one or more query probes. The analytes are immobilized on a surface with a capture probe, then detected with the transiently binding query probe. The technology is not limited in the analyte, capture probe, or query probe. For example, in some embodiments, the query probe is an antibody, nanobody, polypeptide, oligopeptide, or aptamer; for example, in some embodiments, the analyte is a nucleic acid, protein, peptide, lipid, small molecule, metabolite, or any molecule or compound.

In contrast to prior technologies, the technology described herein distinguishes between closely related analytes (e.g., phosphorylated and non-phosphorylated protein targets) with arbitrary precision by analyzing the kinetic behavior of the probe-target interaction.

In various embodiments, the assay conditions are controlled such that the interactions of the query probe with the target analyte are made transient. For example, in some embodiments the technology comprises one or more of the following to provide conditions in which a transient interaction of probe and analyte occurs: (1) engineering a query probe such that it interacts weakly with the target (e.g., in the nanomolar affinity range); (2) controlling the temperature such that the query probe interacts weakly with the target analyte; (3) controlling the solution conditions, e.g., ionic strength, ionic composition, addition of chaotropic agents, addition of competing probes, etc., such that the query probe interacts weakly with the target analyte.

In some embodiments, the technology comprises use of, e.g., photonic forces and/or ultrasound energy. For example, in some embodiments photonic forces promote the concentration of material, especially larger particles, in a particular location. In some embodiments, ultrasound promotes mixing, e.g., to modulate the kinetics association, e.g., by increasing mixing rate beyond simple diffusion.

In some embodiments, binding of the query probe to the target analyte is measured by total internal reflection fluorescence microscopy or another technique capable of single-molecule sensitivity.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "subject" and "patient" refer to any organisms including plants, microorganisms, and animals (e.g., mammals such as dogs, cats, livestock, and humans).

The term "sample" in the present specification and claims is used in its broadest sense. In some embodiments, a sample is or comprises an animal cell or tissue. In some embodiments, a sample includes a specimen or a culture (e.g., a microbiological culture) obtained from any source, as well as biological and environmental samples. Biological samples may be obtained from plants or animals (including humans) and encompass fluids, solids, tissues, and gases. Environmental samples include environmental material such as surface matter, soil, water, and industrial samples. These examples are not to be construed as limiting the sample types applicable to the present technology.

As used herein, a "biological sample" refers to a sample of biological tissue or fluid. For instance, a biological sample may be a sample obtained from an animal (including a human); a fluid, solid, or tissue sample; as well as liquid and solid food and feed products and ingredients such as dairy items, vegetables, meat and meat by-products, and waste. Biological samples may be obtained from all of the various families of domestic animals, as well as feral or wild animals, including, but not limited to, such animals as ungulates, bear, fish, lagomorphs, rodents, etc. Examples of biological samples include sections of tissues, blood, blood fractions, plasma, serum, urine, or samples from other peripheral sources or cell cultures, cell colonies, single cells, or a collection of single cells. Furthermore, a biological sample includes pools or mixtures of the above mentioned samples. A biological sample may be provided by removing a sample of cells from a subject, but can also be provided by using a previously isolated sample. For example, a tissue sample can be removed from a subject suspected of having a disease by conventional biopsy techniques. In some embodiments, a blood sample is taken from a subject. A biological sample from a patient means a sample from a subject suspected to be affected by a disease.

Environmental samples include environmental material such as surface matter, soil, water, and industrial samples, as well as samples obtained from food and dairy processing instruments, apparatus, equipment, utensils, disposable and non-disposable items. These examples are not to be construed as limiting the sample types applicable to the present invention.

The term "label" as used herein refers to any atom, molecule, molecular complex (e.g., metal chelate), or colloidal particle (e.g., quantum dot, nanoparticle, microparticle, etc.) that can be used to provide a detectable (preferably quantifiable) effect, and that can be attached to a nucleic acid or protein. Labels include, but are not limited to, dyes (e.g., optically-detectable labels, fluorescent dyes or moieties, etc.); radiolabels such as $^{32}$P; binding moieties such as biotin; haptens such as digoxgenin; luminogenic, phosphorescent, optically-detectable, or fluorogenic moieties; mass tags; and fluorescent dyes alone or in combination with moieties that can suppress or shift emission spectra by fluorescence resonance energy transfer (FRET). Labels may provide signals detectable by fluorescence, luminescence, radioactivity, colorimetry, gravimetry, X-ray diffraction or absorption, magnetism, enzymatic activity, characteristics of mass or behavior affected by mass (e.g., MALDI time-of-flight mass spectrometry; fluorescence polarization), and the like. A label may be a charged moiety (positive or negative charge) or, alternatively, may be charge neutral. Labels can include or consist of nucleic acid or protein sequence, so long as the sequence comprising the label is detectable.

"Support" or "solid support", as used herein, refers to a matrix on or in which nucleic acid molecules, microparticles, and the like may be immobilized, e.g., to which they may be covalently or noncovalently attached or in or on which they may be partially or completely embedded so that they are largely or entirely prevented from diffusing freely or moving with respect to one another.

As used herein, "moiety" refers to one of two or more parts into which something may be divided, such as, for example, the various parts of an oligonucleotide, a molecule, a chemical group, a domain, a probe, etc.

As used herein, a "nucleic acid" or a "nucleic acid sequence" refers to a polymer or oligomer of pyrimidine and/or purine bases, preferably cytosine, thymine, and uracil, and adenine and guanine, respectively (See Albert L. Lehninger, Principles of Biochemistry, at 793-800 (Worth Pub. 1982)). The present technology contemplates any deoxyribonucleotide, ribonucleotide, or peptide nucleic acid component, and any chemical variants thereof, such as methylated, hydroxymethylated, or glycosylated forms of these bases, and the like. The polymers or oligomers may be heterogenous or homogenous in composition, and may be isolated from naturally occurring sources or may be artificially or synthetically produced. In addition, the nucleic acids may be DNA or RNA, or a mixture thereof, and may exist permanently or transitionally in single-stranded or double-stranded form, including homoduplex, heteroduplex, and hybrid states. In some embodiments, a nucleic acid or nucleic acid sequence comprises other kinds of nucleic acid structures such as, for instance, a DNA/RNA helix, peptide nucleic acid (PNA), morpholino, locked nucleic acid (LNA), and/or a ribozyme. Hence, the term "nucleic acid" or "nucleic acid sequence" may also encompass a chain comprising non-natural nucleotides, modified nucleotides, and/or non-nucleotide building blocks that can exhibit the same function as natural nucleotides (e.g., "nucleotide analogs"); further, the term "nucleic acid sequence" as used herein refers to an oligonucleotide, nucleotide or polynucleotide, and fragments or portions thereof, and to DNA or RNA of genomic or synthetic origin, which may be single or double-stranded, and represent the sense or antisense strand.

The term "nucleotide analog" as used herein refers to modified or non-naturally occurring nucleotides including but not limited to analogs that have altered stacking interactions such as 7-deaza purines (i.e., 7-deaza-dATP and 7-deaza-dGTP); base analogs with alternative hydrogen bonding configurations (e.g., such as Iso-C and Iso-G and other non-standard base pairs described in U.S. Pat. No. 6,001,983 to S. Benner and herein incorporated by reference); non-hydrogen bonding analogs (e.g., non-polar, aromatic nucleoside analogs such as 2,4-difluorotoluene, described by B. A. Schweitzer and E. T. Kool, J. Org. Chem., 1994, 59, 7238-7242, B. A. Schweitzer and E. T. Kool, J. Am. Chem. Soc., 1995, 117, 1863-1872; each of which is herein incorporated by reference); "universal" bases such as 5-nitroindole and 3-nitropyrrole; and universal purines and pyrimidines (such as "K" and "P" nucleotides, respectively; P. Kong, et al., Nucleic Acids Res., 1989, 17, 10373-10383, P. Kong et al., Nucleic Acids Res., 1992, 20, 5149-5152). Nucleotide analogs include nucleotides having modification on the sugar moiety, such as dideoxy nucleotides and 2'-O-methyl nucleotides. Nucleotide analogs include modified forms of deoxyribonucleotides as well as ribonucleotides.

"Peptide nucleic acid" means a DNA mimic that incorporates a peptide-like polyamide backbone.

As used herein, the terms "complementary" or "complementarity" are used in reference to polynucleotides (e.g., a sequence of nucleotides such as an oligonucleotide capture probe, query probe or a target analyte that is a nucleic acid) related by the base-pairing rules. For example, for the sequence "5'-A-G-T-3'" is complementary to the sequence "3'-T-C-A-5'." Complementarity may be "partial," in which only some of the nucleic acids' bases are matched according to the base pairing rules. Or, there may be "complete" or "total" complementarity between the nucleic acids. The degree of complementarity between nucleic acid strands has significant effects on the efficiency and strength of hybridization between nucleic acid strands. This is of particular importance in amplification reactions, as well as detection methods that depend upon binding between nucleic acids. Either term may also be used in reference to individual nucleotides, especially within the context of polynucleotides. For example, a particular nucleotide within an oligonucleotide may be noted for its complementarity, or lack thereof, to a nucleotide within another nucleic acid strand, in contrast or comparison to the complementarity between the rest of the oligonucleotide and the nucleic acid strand.

In some contexts, the term "complementarity" and related terms (e.g., "complementary", "complement") refers to the nucleotides of a nucleic acid sequence that can bind to another nucleic acid sequence through hydrogen bonds, e.g., nucleotides that are capable of base pairing, e.g., by Watson-Crick base pairing or other base pairing. Nucleotides that can form base pairs, e.g., that are complementary to one another, are the pairs: cytosine and guanine, thymine and adenine, adenine and uracil, and guanine and uracil. The percentage complementarity need not be calculated over the entire length of a nucleic acid sequence. The percentage of complementarity may be limited to a specific region of which the nucleic acid sequences that are base-paired, e.g., starting from a first base-paired nucleotide and ending at a last base-paired nucleotide. The complement of a nucleic acid sequence as used herein refers to an oligonucleotide which, when aligned with the nucleic acid sequence such that the 5' end of one sequence is paired with the 3' end of the other, is in "antiparallel association." Certain bases not commonly found in natural nucleic acids may be included in the nucleic acids of the present invention and include, for example, inosine and 7-deazaguanine Complementarity need not be perfect; stable duplexes may contain mismatched base pairs or unmatched bases. Those skilled in the art of nucleic acid technology can determine duplex stability empirically considering a number of variables including, for example, the length of the oligonucleotide, base composition and sequence of the oligonucleotide, ionic strength and incidence of mismatched base pairs.

Thus, in some embodiments, "complementary" refers to a first nucleobase sequence that is at least 60%, 65%, 70%, 75%, 80%, 85%, 90%, 95%, 97%, 98%, or 99% identical to the complement of a second nucleobase sequence over a region of 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more nucleobases, or that the two sequences hybridize under stringent hybridization conditions. "Fully complementary" means each nucleobase of a first nucleic acid is capable of pairing with each nucleobase at a corresponding position in a second nucleic acid. For example, in certain embodiments, an oligonucleotide wherein each nucleobase has complementarity to a nucleic acid has a nucleobase sequence that is identical to the complement of the nucleic acid over a region of 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more nucleobases.

"Mismatch" means a nucleobase of a first nucleic acid that is not capable of pairing with a nucleobase at a corresponding position of a second nucleic acid.

The term "domain" when used in reference to a polypeptide refers to a subsection of the polypeptide which possesses a unique structural and/or functional characteristic; typically, this characteristic is similar across diverse polypeptides. The subsection typically comprises contiguous amino acids, although it may also comprise amino acids which act in concert or which are in close proximity due to folding or other configurations. Examples of a protein domain include transmembrane domains, glycosylation sites, etc.

The term "gene" refers to a nucleic acid (e.g., DNA or RNA) sequence that comprises coding sequences necessary for the production of an RNA, or a polypeptide or its precursor (e.g., proinsulin). A functional polypeptide can be encoded by a full length coding sequence or by any portion of the coding sequence as long as the desired activity or functional properties (e.g., enzymatic activity, ligand binding, signal transduction, etc.) of the polypeptide are retained. The term "portion" when used in reference to a gene refers to fragments of that gene. The fragments may range in size from a few nucleotides to the entire gene sequence minus one nucleotide. Thus, "a nucleotide comprising at least a portion of a gene" may comprise fragments of the gene or the entire gene.

The term "gene" also encompasses the coding regions of a structural gene and includes sequences located adjacent to the coding region on both the 5' and 3' ends for a distance of about 1 kb on either end such that the gene corresponds to the length of the full-length mRNA. The sequences which are located 5' of the coding region and which are present on the mRNA are referred to as 5' non-translated sequences. The sequences which are located 3' or downstream of the coding region and which are present on the mRNA are referred to as 3' non-translated sequences. The term "gene" encompasses both cDNA and genomic forms of a gene. A genomic form or clone of a gene contains the coding region interrupted with non-coding sequences termed "introns" or "intervening regions" or "intervening sequences." Introns are segments of a gene which are transcribed into nuclear RNA (hnRNA); introns may contain regulatory elements such as enhancers. Introns are removed or "spliced out" from the nuclear or primary transcript; introns therefore are absent in the messenger RNA (mRNA) transcript. The mRNA functions during translation to specify the sequence or order of amino acids in a nascent polypeptide.

In addition to containing introns, genomic forms of a gene may also include sequences located on both the 5' and 3' end of the sequences which are present on the RNA transcript. These sequences are referred to as "flanking" sequences or regions (these flanking sequences are located 5' or 3' to the non-translated sequences present on the mRNA transcript). The 5' flanking region may contain regulatory sequences such as promoters and enhancers which control or influence the transcription of the gene. The 3' flanking region may contain sequences which direct the termination of transcription, posttranscriptional cleavage and polyadenylation.

The term "wild-type" refers to a gene or a gene product that has the characteristics of that gene or gene product when isolated from a naturally occurring source. A wild-type gene is that which is most frequently observed in a population and is thus arbitrarily designated the "normal" or "wild-type" form of the gene. In contrast, the term "modified," "mutant," or "polymorphic" refers to a gene or gene product that displays modifications in sequence and or functional properties (i.e., altered characteristics) when compared to the wild-type gene or gene product. It is noted that naturally-occurring mutants can be isolated; these are identified by the fact that they have altered characteristics when compared to the wild-type gene or gene product. Thus, the terms "variant" and "mutant" when used in reference to a nucleotide sequence refer to an nucleic acid sequence that differs by one or more nucleotides from another, usually related nucleotide acid sequence. A "variation" is a difference between two different nucleotide sequences; in some embodiments, one sequence is a reference sequence.

The term "allele" refers to different variations in a gene; the variations include but are not limited to variants and mutants, polymorphic loci and single nucleotide polymorphic loci, frameshift and splice mutations. An allele may occur naturally in a population, or it might arise during the lifetime of any particular individual of the population.

As used herein, the term "hybridization" is used in reference to the pairing of complementary nucleic acids. Hybridization and the strength of hybridization (e.g., the strength of the association between the nucleic acids) is influenced by such factors as the degree of complementary between the nucleic acids, stringency of the conditions involved, and the $T_m$ of the formed hybrid. "Hybridization" methods involve the annealing of one nucleic acid to another, complementary nucleic acid, e.g., a nucleic acid having a complementary nucleotide sequence. The ability of two polymers of nucleic acid containing complementary sequences to find each other and anneal through base pairing interaction is a well-recognized phenomenon. The initial observations of the "hybridization" process by Marmur and Lane, Proc. Natl. Acad. Sci. USA 46:453 (1960) and Doty et al., Proc. Natl. Acad. Sci. USA 46:461 (1960) have been followed by the refinement of this process into an essential tool of modern biology.

As used herein, the term "$T_m$" is used in reference to the "melting temperature." The melting temperature is the temperature at which a population of double-stranded nucleic acid molecules becomes half dissociated into single strands. Several equations for calculating the $T_m$ of nucleic acids are well known in the art. As indicated by standard references, a simple estimate of the $T_m$ value may be calculated by the equation: $T_m=81.5+0.41*(\% G+C)$, when a nucleic acid is in aqueous solution at 1 M NaCl (see, e.g., Anderson and Young, Quantitative Filter Hybridization, in Nucleic Acid Hybridization (1985). Other references (e.g., Allawi and SantaLucia, Biochemistry 36: 10581-94 (1997) include more sophisticated computations which account for structural, environmental, and sequence characteristics to calculate $T_m$. For example, in some embodiments these computations provide an improved estimate of $T_m$ for short nucleic acid probes and targets (e.g., as used in the examples).

The terms "protein" and "polypeptide" refer to compounds comprising amino acids joined via peptide bonds and are used interchangeably. A "protein" or "polypeptide" encoded by a gene is not limited to the amino acid sequence encoded by the gene, but includes post-translational modifications of the protein. Where the term "amino acid sequence" is recited herein to refer to an amino acid sequence of a protein molecule, "amino acid sequence" and like terms such as "polypeptide" or "protein" are not meant to limit the amino acid sequence to the complete, native amino acid sequence associated with the recited protein molecule. Furthermore, an "amino acid sequence" can be deduced from the nucleic acid sequence encoding the protein. Conventional one and three-letter amino acid codes are used herein as follows—Alanine: Ala, A; Arginine: Arg, R; Asparagine: Asn, N; Asp artate: Asp, D; Cysteine: Cys, C; Glutamate: Glu, E; Glutamine: Gln, Q; Glycine: Gly, G; Histidine: His, H; Isoleucine: Ile, I; Leucine: Leu, L; Lysine: Lys, K; Methionine: Met, M; Phenylalanine: Phe, F; Proline: Pro, P; Serine: Ser, S; Threonine: Thr, T; Tryptophan: Trp, W; Tyrosine: Tyr, Y; Valine: Val, V. As used herein, the codes Xaa and X refer to any amino acid.

The terms "variant" and "mutant" when used in reference to a polypeptide refer to an amino acid sequence that differs by one or more amino acids from another, usually related polypeptide.

As used herein, the term "melting" when used in reference to a nucleic acid refers to the dissociation of a double-stranded nucleic acid or region of a nucleic acid into a single-stranded nucleic acid or region of a nucleic acid.

As used herein, a "query probe" or "reader probe" is any entity (e.g., molecule, biomolecule, etc.) that recognizes an analyte (e.g., binds to an analyte, e.g., binds specifically to an analyte). In exemplary embodiments, the query probe is a protein that recognizes an analyte. In some other exemplary embodiments, the query probe is a nucleic acid that recognizes an analyte (e.g., a DNA, an RNA, a nucleic acid comprising DNA and RNA, a nucleic acid comprising modified bases and/or modified linkages between bases; e.g., a nucleic acid as described hereinabove, a nucleic acid aptamer). In some embodiments, the query probe is labeled, e.g., with a detectable label such as, e.g., a fluorescent moiety as described herein. In some embodiments, the query probe comprises more than one type of molecule (e.g., more than one of a protein, a nucleic acid, a chemical linker or a chemical moiety).

As used herein, an "event" refers to an instance of a query probe binding to an analyte or an instance of query probe dissociation from an analyte, e.g., as measured by monitoring a detectable property indicating the binding of a query probe to an analyte and/or the dissociation of a query probe from an analyte.

As used herein, a "capture probe" is any entity (e.g., molecule, biomolecule, etc.) that recognizes an analyte (e.g., binds to an analyte, e.g., binds specifically to an analyte) and links the analyte to a solid support. In exemplary embodiments, the capture probe is a protein that recognizes an analyte. In some other exemplary embodiments, a capture probe is a nucleic acid that recognizes an analyte (e.g., a DNA, an RNA, a nucleic acid comprising DNA and RNA, a nucleic acid comprising modified bases and/or modified linkages between bases; e.g., a nucleic acid as described hereinabove, a nucleic acid aptamer). In some embodiments, a capture probe is labeled, e.g., with a detectable label such as, e.g., a fluorescent moiety as described herein. In some embodiments, the capture probe comprises more than one type of molecule (e.g., more than one of a protein, a nucleic acid, a chemical linker or a chemical moiety).

As used herein, the term "sensitivity" refers to the probability that an assay gives a positive result for the analyte when the sample comprises the analyte. Sensitivity is calculated as the number of true positive results divided by the sum of the true positives and false negatives. Sensitivity is a measure of how well an assay detects an analyte.

As used herein, the term "specificity" refers to the probability that an assay gives a negative result when the sample does not comprise the analyte. Specificity is calculated as the number of true negative results divided by the sum of the true negatives and false positives. Specificity is a measure of how well a method of the present invention excludes samples that do not comprise an analyte from those that do comprise the analyte.

As used herein, the "equilibrium constant" ($K_{eq}$), the "equilibrium association constant" ($K_a$), and "association binding constant" (or "binding constant"($K_B$)) are used interchangeably for the following binding reaction of A and B at equilibrium:

where A and B are two entities that associate with each other (e.g., capture probe and analyte, query probe and analyte) and $K_{eq}=[AB]/([A]\times[B])$. The dissociation constant $K_D=1/K_B$. The $K_D$ is a useful way to describe the affinity of a one binding partner A for a partner B with which it associates, e.g., the number $K_D$ represents the concentration of A or B that is required to yield a significant amount of AB. $K_{eq}=k_{off}/k_{on}$; $K_D=k_{off}/k_{on}$.

As used herein, a "significant amount" of the product of two entities that associate with each other, e.g., formation of AB from A and B according to the equation above, refers to a concentration of AB that is equal to or greater than the free concentration of A or B, whichever is smaller.

As used herein, "nanomolar affinity range" refers to the association of two components that has an equilibrium dissociation constant $K_D$ (e.g., ratio of $k_{off}/k_{on}$) in the nanomolar range, e.g., a dissociation constant ($K_D$) of $1\times10^{-10}$ to $1\times10^{-5}$M (e.g., in some embodiments $1\times10^{-9}$ to $1\times10^{-6}$ M). The dissociation constant has molar units (M). The smaller the dissociation constant, the higher the affinity between two components (e.g., capture probe and analyte; query probe and analyte).

As used herein, a "weak affinity" or "weak binding" or "weak association" refers to an association having a $K_D$ of approximately 100 nanomolar (e.g., approximately 10, 20, 30, 40, 50, 60, 70, 80, 90, 100, 110, 120, 130, 140, 150, 160, 170, 180, 190, 200, 300, 400, or 500 nanomolar) and/or, in some embodiments, in the range of 1 nanomolar to 10 micromolar.

The terms "specific binding" or "specifically binding" when used in reference to the interaction of two components A and B that associate with one another refers to an association of A and B having a $K_D$ that is smaller than the $K_D$ for the interaction of A or B with other similar components in the solution, e.g., at least one other molecular species in the solution that is not A or B.

As used herein, the word "presence" or "absence" (or, alternatively, "present" or "absent") is used in a relative sense to describe the amount or level of a particular entity (e.g., an analyte). For example, when an analyte is said to be "present" in a sample, it means the level or amount of this analyte is above a pre-determined threshold; conversely, when an analyte is said to be "absent" in a sample, it means the level or amount of this analyte is below a pre-determined threshold. The pre-determined threshold may be the threshold for detectability associated with the particular test used to detect the analyte or any other threshold. When an analyte is "detected" in a sample it is "present" in the sample; when an analyte is "not detected" it is "absent" from the sample. Further, a sample in which an analyte is "detected" or in which the analyte is "present" is a sample that is "positive" for the analyte. A sample in which an analyte is "not detected" or in which the analyte is "absent" is a sample that is "negative" for the analyte.

As used herein, an "increase" or a "decrease" refers to a detectable (e.g., measured) positive or negative change in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

The term "detection assay" refers to an assay for detecting the presence or absence of an analyte or the activity or effect of an analyte or for detecting the presence or absence of a variant of an analyte.

A "system" denotes a set of components, real or abstract, comprising a whole where each component interacts with or is related to at least one other component within the whole.

In some embodiments the technology comprises an antibody component or moiety, e.g., an antibody or fragments or derivatives thereof. As used herein, an "antibody", also known as an "immunoglobulin" (e.g., IgG, IgM, IgA, IgD, IgE), comprises two heavy chains linked to each other by disulfide bonds and two light chains, each of which is linked to a heavy chain by a disulfide bond. The specificity of an antibody resides in the structural complementarity between the antigen combining site of the antibody (or paratope) and the antigen determinant (or epitope). Antigen combining sites are made up of residues that are primarily from the hypervariable or complementarity determining regions (CDRs). Occasionally, residues from nonhypervariable or framework regions influence the overall domain structure and hence the combining site. Some embodiments comprise a fragment of an antibody, e.g., any protein or polypeptide-containing molecule that comprises at least a portion of an immunoglobulin molecule such as to permit specific interaction between said molecule and an antigen. The portion of an immunoglobulin molecule may include, but is not limited to, at least one complementarity determining region (CDR) of a heavy or light chain or a ligand binding portion thereof, a heavy chain or light chain variable region, a heavy chain or light chain constant region, a framework region, or any portion thereof. Such fragments may be produced by enzymatic cleavage, synthetic or recombinant techniques, as known in the art and/or as described herein. Antibodies can also be produced in a variety of truncated forms using antibody genes in which one or more stop codons have been introduced upstream of the natural stop site. The various portions of antibodies can be joined together chemically by conventional techniques, or can be prepared as a contiguous protein using genetic engineering techniques.

Fragments of antibodies include, but are not limited to, Fab (e.g., by papain digestion), F(ab')$_2$ (e.g., by pepsin digestion), Fab' (e.g., by pepsin digestion and partial reduction) and Fv or scFv (e.g., by molecular biology techniques) fragments.

A Fab fragment can be obtained by treating an antibody with the protease papaine. Also, the Fab may be produced by inserting DNA encoding a Fab of the antibody into a vector for prokaryotic expression system or for eukaryotic expression system, and introducing the vector into a prokaryote or eukaryote to express the Fab. A F(ab')$_2$ may be obtained by treating an antibody with the protease pepsin. Also, the F(ab')$_2$ can be produced by binding a Fab' via a thioether bond or a disulfide bond. A Fab may be obtained by treating F(ab')$_2$ with a reducing agent, e.g., dithiothreitol. Also, a Fab' can be produced by inserting DNA encoding a Fab' fragment of the antibody into an expression vector for a prokaryote or an expression vector for a eukaryote, and introducing the vector into a prokaryote or eukaryote for its expression. A Fv fragment may be produced by restricted cleavage by pepsin, e.g., at 4° C. and pH 4.0. (a method called "cold pepsin digestion"). The Fv fragment consists of the heavy chain variable domain ($V_H$) and the light chain variable domain ($V_L$) held together by strong noncovalent interaction. A scFv fragment may be produced by obtaining cDNA encoding the $V_H$ and $V_L$ domains as previously described, constructing DNA encoding scFv, inserting the DNA into an expression vector for prokaryote or an expression vector for eukaryote, and then introducing the expression vector into a prokaryote or eukaryote to express the scFv.

In general, antibodies can usually be raised to any antigen, using the many conventional techniques now well known in the art.

As used herein, the term "conjugated" refers to when one molecule or agent is physically or chemically coupled or adhered to another molecule or agent. Examples of conjugation include covalent linkage and electrostatic complexation. The terms "complexed," "complexed with," and "conjugated" are used interchangeably herein.

As used herein, a "stable interaction" or referring to a "stably bound" interaction refers to an association that is relatively persistent under the thermodynamic equilibrium conditions of the interaction. In some embodiments, a "stable interaction" is an interaction between two components having a $K_D$ that is smaller than approximately $10^{-9}$ M or, in some embodiments a $K_D$ that is smaller than $10^{-8}$ M. In some embodiments, a "stable interaction" has a dissociation rate constant $k_{off}$ that is smaller than 1 per hour or, in some embodiments, a dissociation rate constant $k_{off}$ that is smaller than 1 per minute. In some embodiments, a "stable interaction" is defined as not being a "transient interaction". In some embodiments, a "stable interaction" includes interactions mediated by covalent bonds and other interactions that are not typically described by a $K_D$ value but that involve an average association lifetime between two entities that is longer than approximately 1 minute (e.g., 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180 seconds) per each interaction.

In some embodiments, the distinction between a "stable interaction" and a "transient interaction" is determined by a cutoff value of $K_D$ and/or $k_{off}$ and/or another kinetic or thermodynamic value describing the associations, wherein the cutoff is used to discriminate between stable and transient interactions that might otherwise be characterized differently if described in absolute terms of a $K_D$ and/or $k_{off}$ or another kinetic or thermodynamic value describing the associations. For example, a "stable interaction" characterized by a $K_D$ value might also be characterized as a "transient interaction" in the context of another interaction that is even more stable. One of skill in the art would understand other relative comparisons of stable and transient interactions, e.g., that a "transient interaction" characterized by a $K_D$ value might also be characterized as a "stable interaction" in the context of another interaction that is even more transient (less stable).

As used herein, "moiety" refers to one of two or more parts into which something may be divided, such as, for example, the various parts of an oligonucleotide, a molecule, a chemical group, a domain, a probe, an "R" group, a polypeptide, etc.

As used herein, in some embodiments a "signal" is a time-varying quantity associated with one or more properties of a sample that is assayed, e.g., the binding of a query probe to an analyte and/or dissociation of a query probe from an analyte. A signal can be continuous in the time domain or discrete in the time domain. As a mathematical abstraction, the domain of a continuous-time signal is the set of real numbers (or an interval thereof) and the domain of a discrete-time signal is the set of integers (or an interval thereof). Discrete signals often arise via "digital sampling" of continuous signals. For example, an audio signal consists of a continually fluctuating voltage on a line that can be digitized by reading the voltage level on the line at a regular interval, e.g., every 50 microseconds. The resulting stream of numbers is stored as a discrete-time digital signal. In some embodiments, the signal is recorded as a function of location is space (e.g., x, y coordinates; e.g., x, y, z coordinates). In some embodiments, the signal is recorded as a function of time. In some embodiments, the signal is recorded as a function of time and location.

The term "substantially" as used herein, is a broad term and is used in its ordinary sense, including, but not limited to, being largely but not necessarily wholly that which is specified.

The term "algorithm," as used herein, is a broad term and is used in its ordinary sense, including, but not limited to, the computational processes (for example, programs) involved in transforming information from one state to another, for example using computer processing.

Description

Although the disclosure herein refers to certain illustrated embodiments, it is to be understood that these embodiments are presented by way of example and not by way of limitation.

Poisson Processes

Embodiments of the technology are related to single-molecule recognition by recording the characteristic kinetics of a query probe binding to a target analyte. In particular embodiments, this process is a Poisson process. A Poisson process is a continuous-time stochastic process that counts the number of events and the time that events (e.g., transient binding of a detectably labeled (e.g., fluorescent) query probe to an immobilized target analyte) occur in a given time interval. The time interval between each pair of consecutive events has an exponential distribution and each interval is assumed to be independent of other intervals. The Poisson distribution is a discrete probability distribution that expresses the probability of a given number of the events occurring in the given time interval if these events occur with a known average rate and independently of the time since the last event. The Poisson distribution can also be used for the number of events in other specified intervals such as distance, area, or volume.

A Poisson distribution is a special case of the general binomial distribution where the number of trials n is large, the probability of success p is small, and the product $np=\lambda$ is moderate. In a Poisson process, the probability that a number of events N is j at any arbitrary time t follows the Poisson probability distribution $P_j(t)$:

$$P_j(t) = \frac{e^{-\lambda t}(\lambda t)^j}{j!}, j = 0, 1, 2, \ldots . \quad (1)$$

That is, the number N of events that occur up to time t has a Poisson distribution with parameter $\lambda t$. Statistical and mathematical methods relevant to Poisson processes and Poisson distributions are known in the art. See, e.g., "Stochastic Processes (i): Poisson Processes and Markov Chains" in *Statistics for Biology and Health—Statistical Methods in Bioinformatics* (Ewans and Grant, eds.), Springer (New York, 2001), page 129 et seq., incorporated herein by reference in its entirety. Software packages such as Matlab and R may be used to perform mathematical and statistical methods associated with Poisson processes, probabilities, and distributions.

Kinetics of Detection

Particular embodiments of the technology are related to detecting an analyte by analyzing the kinetics of the interaction of a query probe with the analyte to be detected. For the interaction of a query probe Q (e.g., at an equilibrium concentration [Q]) with a target analyte T (e.g., at an equilibrium concentration [T]), the kinetic rate constant $k_{on}$ describes the time-dependent formation of the complex QT comprising the probe Q hybridized to the analyte T. In particular embodiments, while the formation of the QT complex is associated with a second order rate constant that is dependent on the concentration of query probe and has units of $M^{-1}$ $min^{-1}$ (or the like), the formation of the QT complex is sufficiently described by a $k_{on}$ that is a pseudo-first order rate constant associated with the formation of the QT complex. Thus, as used herein, $k_{on}$ is an apparent ("pseudo") first-order rate constant.

Likewise, the kinetic rate constant $k_{off}$ describes the time-dependent dissociation of the complex QT into the probe Q and the analyte T. Kinetic rates are typically provided herein in units of $min^{-1}$ or $s^{-1}$. The "dwell time" of the query probe Q in the bound state ($\tau_{on}$) is the time interval (e.g., length of time) that the probe Q is hybridized to the analyte T during each instance of query probe Q binding to the analyte T to form the QT complex. The "dwell time" of the query probe Q in the unbound state ($\tau_{off}$) is the time interval (e.g., length of time) that the probe Q is not hybridized to the analyte T between each instance of query probe Q binding to the analyte to form the QT complex (e.g., the time the query probe Q is dissociated from the target analyte T between successive binding events of the query probe Q to the target analyte T). Dwell times may be provided as averages or weighted averages integrating over numerous binding and non-binding events.

Further, in some embodiments, the repeated, stochastic binding of probes (e.g., detectably labeled query probes (e.g., fluorescent probes) to target analytes is modeled as a Poisson process occurring with constant probability per unit time and in which the standard deviation in the number of binding and dissociation events per unit time ($N_{b+d}$) increases as $(N_{b+d})^{1/2}$. Thus, the statistical noise becomes a smaller fraction of $N_{b+d}$ as the observation time is increased. Accordingly, the observation is lengthened as needed in some embodiments to achieve discrimination between target and off-target binding. And, as the acquisition time is increased, the signal and background peaks in the $N_{b+d}$ histogram become increasingly separated and the width of the signal distribution increases as the square root of $N_{b+d}$, consistent with kinetic Monte Carlo simulations.

Further, in some embodiments assay conditions are controlled to tune the kinetic behavior to improve discrimination of query probe binding events to the target analyte from background binding. For example, in some embodiments the technology comprises control of assay conditions such as, e.g., using a query probe that is designed to interact weakly with the target analyte (e.g., in the nanomolar affinity range); controlling the temperature such that the query probe interacts weakly with the target analyte; controlling the solution conditions, e.g., ionic strength, ionic composition, addition of chaotropic agents, and addition of competing probes.

Analytes

The technology is not limited in the analyte that is detected, quantified, identified, or otherwise characterized (e.g., presence, absence, amount, concentration, state). The term "analyte" as used herein is a broad term and is used in its ordinary sense, including, without limitation, to refer to a substance or chemical constituent in a sample such as a biological fluid (for example, blood, interstitial fluid, cerebral spinal fluid, lymph fluid or urine) that can be analyzed. Analytes can include naturally occurring substances, artificial substances, metabolites, and/or reaction products. In some embodiments, the analyte comprises a salt, sugars, protein, fat, vitamin, or hormone. In some embodiments, the analyte is naturally present in a biological sample (e.g., is "endogenous"); for example, in some embodiments, the analyte is a metabolic product, a hormone, an antigen, an antibody, and the like. Alternatively, in some embodiments, the analyte is introduced into a biological organism (e.g., is "exogenous), for example, a drug, drug metabolite, a drug precursor (e.g., prodrug), a contrast agent for imaging, a radioisotope, a chemical agent, etc. The metabolic products of drugs and pharmaceutical compositions are also contemplated analytes.

In some embodiments, the analyte is a polypeptide, a nucleic acid, a small molecule, a lipid, a carbohydrate, a polysaccharide, a fatty acid, a phospholipid, a glycolipid, a sphingolipid, an organic molecule, an inorganic molecule, cofactor, pharmaceutical, bioactive agent, a cell, a tissue, an organism, etc. In some embodiments, the analyte comprises a polypeptide, a nucleic acid, a small molecule, a lipid, a carbohydrate, a polysaccharide, a fatty acid, a phospholipid, a glycolipid, a sphingolipid, an organic molecule, an inorganic molecule, cofactor, pharmaceutical, bioactive agent, a cell, a tissue, an organism, etc. In some embodiments, the analyte comprises a combination of one or more of a polypeptide, a nucleic acid, a small molecule, a lipid, a carbohydrate, a polysaccharide, a fatty acid, a phospholipid, a glycolipid, a sphingolipid, an organic molecule, an inorganic molecule, cofactor, pharmaceutical, bioactive agent, a cell, a tissue, an organism, etc.

In some embodiments, the analyte is part of a multimolecular complex, e.g., a multiprotein complex, a nucleic acid/protein complex, a molecular machine, an organelle (e.g., a cell-free mitochondrion, e.g., in plasma; a plastid; golgi, endoplasmic reticulum, vacuole, peroxisome, lysosome, and/or nucleus), cell, virus particle, tissue, organism, or any macromolecular complex or structure or other entity that can be captured and is amenable to analysis by the technology described herein (e.g., a ribosome, spliceosome, vault, proteasome, DNA polymerase III holoenzyme, RNA polymerase II holoenzyme, symmetric viral capsids, GroEL/GroES; membrane protein complexes: photosystem I, ATP synthase, nucleosome, centriole and microtubule-organizing center (MTOC), cytoskeleton, flagellum, nucleolus, stress granule, germ cell granule, or neuronal transport granule). For example, in some embodiments a multimolecular complex is isolated and the technology finds use in characterizing, identifying, quantifying, and/or detecting one or more molecules (analytes) associated with (e.g., that is a component of) the multimolecular complex. In some embodiments an extracellular vesicle is isolated and the technology finds use in characterizing, identifying, quantifying, and/or detecting one or more molecules (analytes) associated with the vesicle. In some embodiments, the technology finds use in characterizing, identifying, quantifying, and/or detecting a protein (e.g., a surface protein) and/or an analytes present inside the vesicle, e.g., a protein, nucleic acid, or other analyte described herein. In some embodiments, the vesicle is fixed and permeabilized prior to analysis.

In some embodiments, the analyte is chemically modified to provide a site for query probe binding. For instance, in some embodiments, beta-elimination of phosphoserine and phosphothreonine under strongly basic conditions is used to introduce an alkene, followed by Michael addition of a nucleophile such as a dithiol to the alkene. The remaining free thiol is then used for conjugation to a maleimide-containing oligonucleotide with a sequence complementary to an oligonucleotide query probe. The post-translational modifications phosphoserine and phosphothreonine may then be probed using the query probe and analyzed as described herein.

As used herein "detect an analyte" or "detect a substance" will be understood to encompass direct detection of the analyte itself or indirect detection of the analyte by detecting its by-product(s).

Capture

Embodiments of the technology comprise capture of an analyte. In some embodiments, the analyte is captured and immobilized. In some embodiments, the analyte is stably attached to a solid support. In some embodiments, the solid support is immobile relative to a bulk liquid phase contacting the solid support. In some embodiments, the solid support is diffusible within a bulk liquid phase contacting the solid support.

In some embodiments, stable attachment of the target analyte to a surface or other solid substrate is provided by a high-affinity or irreversible interaction (e.g., as used herein, an "irreversible interaction" refers to an interaction having a dissociation half-life longer than the observation time, e.g., in some embodiments, a time that is 1 to 5 minutes (e.g., 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, or 600 seconds, or longer). The technology is not limited in the components and/or methods used for capture of the analyte. For example, the stable attachment is provided by a variety of methods, including but not limited to one or more of the following.

In some embodiments, an analyte is immobilized by a surface-bound capture probe with a dissociation constant ($K_D$) for the analyte smaller than approximately 1 nanomolar (nM) (e.g., less than 1.5, 1.4, 1.3, 1.2, 1.1, 1.0, 0.9, 0.8, 0.7, 0.6, 0.5 nanomolar) and a dissociation rate constant for the analyte that is smaller than approximately 1 $min^{-1}$ (e.g., less than approximately 1.5, 1.4, 1.3, 1.2, 1.1, 1.0, 0.9, 0.8, 0.7, 0.6, 0.5 $min^{-1}$). Exemplary surface-bound capture probes include, e.g., an antibody, antibody fragment, nanobody, or other protein; a high-affinity DNA-binding protein or ribonucleoprotein complex such as Cas9, dCas9, Cpf1, transcription factors, or transcription activator-like effector nucleases (TALENs); an oligonucleotide; a small organic molecule; or a metal ion complex.

In some embodiments, an analyte is immobilized by direct noncovalent attachment to a surface (e.g., by interactions between the analyte and the surface, e.g., a glass surface or a nylon, nitrocellulose, or polyvinylidene difluoride membrane).

In some embodiments, an analyte is immobilized by chemical linking (e.g., by a covalent bond) of the analyte to the solid support. In some embodiments, the analyte is chemically linked to the solid support by, e.g., a carbodiimide, a N-hydroxysuccinimide esters (NHS) ester, a maleimide, a haloacetyl group, a hydrazide, or an alkoxyamine In some embodiments, an analyte is immobilized by radiation (e.g., ultraviolet light)-induced cross-linking of the target analyte to the surface and/or to a capture probe attached to the surface. In some embodiments, the capture probe is a rabbit monoclonal antibody. In some embodiments in which the analyte comprises a carbohydrate or polysaccharide, the capture probe comprises a carbohydrate-binding protein such as a lectin or a carbohydrate-binding antibody.

Alternatively, instead of immobilizing the target analyte to a solid support that is relatively stationary with respect to a bulk phase that contacts the solid support as described above, some embodiments provide that the target analyte is associated with a freely diffusing particle that diffuses within the bulk fluid phase contacting the freely diffusing particle. Accordingly, in some embodiments, the target analyte is covalently or noncovalently bound to a freely diffusing substrate. In some embodiments, the freely diffusing substrate is, e.g., a colloidal particle (e.g., a particle having a diameter of approximately 10-1000 nm (e.g., 10, 20, 30, 40, 50, 60, 70, 80, 90, 100, 110, 120, 130, 140, 150, 200, 250, 300, 350, 400, 450, 500, 550, 600, 650, 700, 750, 800, 850, 900, 950, or 1000 nm)). In some embodiments, the freely diffusing substrate comprises and/or is made of, e.g., polystyrene, silica, dextran, gold, or DNA origami. In some embodiments, the target analyte is associated with a freely diffusing particle that diffuses slowly relative to the diffusion of the query probe, e.g., the target analyte has a diffusion coefficient that is less than approximately 10% (e.g., less than 15, 14, 13, 12, 11, 10.5, 10.4, 10.3, 10.2, 10.1, 10.0, 9.9, 9.8, 9.7, 9.6, 9.5, or 9.0% or less) of the diffusion coefficient of the query probe.

Furthermore, in some embodiments the target analyte is associated with a freely diffusing particle and the location of the target analyte is observable and/or recordable independently of observing and/or recording query probe binding. For example, in some embodiments a detectable label (e.g., a fluorophore, fluorescent protein, quantum dot) is covalently or noncovalently attached to the target analyte, e.g., for detection and localization of the target analyte. Accordingly, in some embodiments the position of the target analyte and the position of query probe binding events are simultaneously and independently measured.

Query

Embodiments of the technology comprise a query probe (e.g., a detectably labeled query probe) that binds transiently and repeatedly to the analyte, e.g., a query probe that binds to and dissociates from the target analyte several (e.g., greater than 1, 2, 3, 4, 5, 6, 7, 8, 9, 10, or more) times per observation window. In some embodiments, the query probe has a dissociation constant ($K_D$) for the analyte of larger than approximately 1 nanomolar (e.g., greater than 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 or more nanomolar) under the assay conditions. In some embodiments, the query probe has a binding and/or a dissociation constant for the analyte that is larger than approximately 1 $min^{-1}$ (e.g., greater than 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 or more $min^{-1}$).

The technology is not limited in the query probe. In some embodiments, the query probe is an antibody or antibody fragment. In some embodiments, the query probe is a low-affinity antibody or antibody fragment. In some embodiments, the query probe is a nanobody, a DNA-binding protein or protein domain, a methylation binding domain (MBD), a kinase, a phosphatase, an acetylase, a deacetylase, an enzyme, or a polypeptide. In some embodiments, the query probe is an oligonucleotide that interacts with the target analyte. For example, in some embodiments the query probe is an oligonucleotide that hybridizes to the target analyte to form a duplex that has a melting temperature that is within approximately 10 degrees Celsius of the temperature at which the observations are made (e.g., approximately 7-12 nucleotides for observation that is performed at room temperature). In some embodiments, the query probe is a mononucleotide. In some embodiments, the query probe is a small organic molecule (e.g., a molecule having a molecular weight that is less than approximately 2000 daltons, e.g., less than 2100, 2050, 2000, 1950, 1900, 1850, 1800, 1750, 1700, 1650, 1600, 1550, 1500 daltons, or less). In some embodiments, the query probe is a pharmaceutical agent, e.g., a drug or other bioactive molecule. In some embodiments, the query probe is a metal ion complex. In some embodiments, the query probe is a methyl-binding domain (e.g., MBD1). In some embodiments, the query probe is labeled with a detectable label as described herein. In some embodiments, the query probe is covalently linked to the detectable label. In some embodiments, the query probe is indirectly and/or non-covalently linked and/or associated with the detectable label. In some embodiments, the detectable label is fluorescent.

In some embodiments, the query probe is a mouse monoclonal antibody.

In some embodiments in which the analyte comprises a carbohydrate or polysaccharide, the query probe comprises a carbohydrate-binding protein such as a lectin or a carbohydrate-binding antibody.

Detection

The technology provides for the detection of target analytes, e.g., in the presence of similar analytes and, in some embodiments, background noise. In some embodiments, signal originating from the transient binding of the query probe to the target analyte is distinguishable from the signal produced by unbound query probe (e.g., by observing, monitoring, and/or recording a localized change in signal intensity during the binding event). In some embodiments, observing the transient binding of the query probe (e.g., a fluorescently labeled query probe) to the target analyte is provided by a technology such as, e.g., total internal reflection fluorescence (TIRF) or near-TIRF microscopy, zero-mode waveguides (ZMWs), light sheet microscopy, stimulated emission depletion (STED) microscopy, or confocal microscopy. In some embodiments, the technology provided herein uses query probes having a fluorescence emission that is quenched when not bound to the target analyte and/or a fluorescence emission that is dequenched when bound to the target analyte.

The technology comprises locating and/or observing the transient binding of a query probe to an analyte within a discrete region of an area and/or a discreet region of a volume that is observed, e.g., at particular spatial coordinates in a plane or a volume. In some embodiments, the error in determining the spatial coordinates of a binding or dissociation event (e.g., due to limited signal, detector noise, or spatial binning in the detector) is small (e.g., minimized, eliminated) relative to the average spacing between immobilized (e.g., surface-bound) target analytes. In some embodiments comprising use of wide-field fluorescence microscopy, measurement errors are minimized and/or eliminated by use of effective detector pixel dimensions in the specimen plane that are not larger than the average distance between immobilized (e.g., surface-bound) target analytes and that many fluorescent photons (in some embodiments, more than 100, e.g., more than 80, 85, 90, 95, 100, 105, 110, 115, 120, 125, or 130 or more) are collected per time point of detection.

In some embodiments, the detectable (e.g., fluorescent) query probe produces a fluorescence emission signal when it is close to the surface of the solid support (e.g., within about 100 nm of the surface of the solid support). When unbound, query probes quickly diffuse and thus are not individually detected; accordingly, when in the unbound state, the query probes produce a low level of diffuse background fluorescence. Consequently, in some embodiments detection of bound query probes comprises use of total internal reflection fluorescence microscopy (TIRO, HiLo microscopy (see, e.g., US20090084980, EP2300983 B1, WO2014018584 A1, WO2014018584 A1, incorporated herein by reference), confocal scanning microscopy, or other technologies comprising illumination schemes that illuminate (e.g., excite) only those query probe molecules near or on the surface of the solid support. Thus, in some embodiments, only query probes that are bound to an immobilized target near or on the surface produce a point-like emission signal (e.g., a "spot") that can be confirmed as originating from a single molecule.

In some embodiments, the query probe comprises a fluorescent label having an emission wavelength. Detection of fluorescence emission at the emission wavelength of the fluorescent label indicates that the query probe is bound to an immobilized target analyte. Binding of the query probe to the target analyte is a "binding event". In some embodiments of the technology, a binding event has a fluorescence emission having a measured intensity greater than a defined threshold. For example, in some embodiments a binding event has a fluorescence intensity that is above the background fluorescence intensity (e.g., the fluorescence intensity observed in the absence of a target analyte). In some embodiments, a binding event has a fluorescence intensity that is at least 1, 2, 3, 4 or more standard deviations above the background fluorescence intensity (e.g., the fluorescence intensity observed in the absence of a target analyte). In some embodiments, a binding event has a fluorescence intensity that is at least 2 standard deviations above the background fluorescence intensity (e.g., the fluorescence intensity observed in the absence of a target analyte). In some embodiments, a binding event has a fluorescence intensity that is at least 1.5, 2, 3, 4, or 5 times the background fluorescence intensity (e.g., the mean fluorescence intensity observed in the absence of a target analyte).

Accordingly, in some embodiments detecting fluorescence at the emission wavelength of the query probe that has an intensity above the defined threshold (e.g., at least 2 standard deviations greater than background intensity) indicates that a binding event has occurred (e.g., at a discrete location on the solid support where a target analyte is immobilized). Also, in some embodiments detecting fluorescence at the emission wavelength of the query probe that has an intensity above the defined threshold (e.g., at least 2 standard deviations greater than background intensity) indicates that a binding event has started. Accordingly, in some embodiments detecting an absence of fluorescence at the emission wavelength of the query probe that has an intensity above the defined threshold (e.g., at least 2 standard deviations greater than background intensity) indicates that a binding event has ended (e.g., the query probe has dissociated from the target analyte). The length of time between when the binding event started and when the binding event ended (e.g., the length of time that fluorescence at the emission wavelength of the fluorescent probe having an intensity above the defined threshold (e.g., at least 2 standard deviations greater than background intensity) is detected) is the dwell time of the binding event. A "transition" refers to the binding and dissociation of a query probe to the target analyte (e.g., an on/off event), e.g., a query probe dissociating from a bound state or a query probe associating with a target analyte from the unbound state.

Methods according to the technology comprise counting the number of query probe binding events that occur at each discrete location (e.g., at a position identified by x, y coordinates) on the solid support during a defined time interval that is the "acquisition time" (e.g., a time interval that is tens to hundreds to thousands of seconds, e.g., 5, 10, 15, 20, 25, 30, 35, 40, 45, 50, 55, or 60 seconds; e.g., 5, 10, 15, 20, 25, 30, 35, 40, 45, 50, 55, or 0 minutes; e.g., 1, 1.5, 2, 2.5, or 3 hours). In some embodiments, the acquisition time is approximately 1 to 10 seconds to 1 to 10 minutes (e.g., approximately 1 to 100 seconds, e.g., 1, 2, 3, 4, 5, 6, 7, 8, 9, 10, 11, 12, 13, 14, 15, 16, 17, 18, 19, 20, 30, 40, 50, 60, 70, 80, 90, or 100 seconds, e.g., 1 to 100 minutes, e.g., 1, 2, 3, 4, 5, 6, 7, 8, 9, 10, 11, 12, 13, 14, 15, 16, 17, 18, 19, 20, 30, 40, 50, 60, 70, 80, 90, or 100 minutes).

Further, the length of time the query probe remains bound to the target analyte during a binding event is the "dwell time" of the binding event. The number of binding events detected during the acquisition time and/or the lengths of the dwell times recorded for the binding events is/are characteristic of a query probe binding to a target analyte and thus provide an indication that the target analyte is immobilized at said discrete location and thus that the target analyte is present in the sample.

Binding of the query probe to the immobilized target analyte and/or and dissociation of the query probe from the immobilized target analyte is/are monitored (e.g., using a light source to excite the fluorescent probe and detecting fluorescence emission from a bound query probe, e.g., using a fluorescence microscope) and/or recorded during a defined time interval (e.g., during the acquisition time). The number of times the query probe binds to the nucleic acid during the acquisition time and/or the length of time the query probe remains bound to the nucleic acid during each binding event and the length of time the query probe remains unbound to the nucleic acid between each binding event (e.g., the "dwell times" in the bound and unbound states, respectively) are determined, e.g., by the use of a computer and software (e.g., to analyze the data using a hidden Markov model and Poisson statistics).

In some embodiments, positive and/or negative control samples are measured (e.g., a control sample known to comprise or not to comprise a target). Fluorescence detected in a negative control sample is "background fluorescence" or "background (fluorescence) intensity" or "baseline".

In some embodiments, data comprising measurements of fluorescence intensity at the emission wavelength of the query probe are recorded as a function of time. In some embodiments, the number of binding events and the dwell times of binding events (e.g. for each immobilized analyte) are determined from the data (e.g., by determining the number of times and the lengths of time the fluorescence intensity is above a threshold background fluorescence intensity). In some embodiments, transitions (e.g., binding and dissociation of a query probe) are counted for each discrete location on the solid support where a target analyte is immobilized. In some embodiments, a threshold number of transitions is used to discriminate the presence of a target analyte at a discrete location on the solid support from background signal, non-target analyte, and/or spurious binding of the query probe.

In some embodiments, a distribution of the number of transitions for each immobilized target is determined—e.g., the number of transitions is counted for each immobilized analyte observed. In some embodiments a histogram is produced. In some embodiments, characteristic parameters of the distribution are determined, e.g., the mean, median, peak, shape, etc. of the distribution are determined. In some embodiments, data and/or parameters (e.g., fluorescence data (e.g., fluorescence data in the time domain), kinetic data, characteristic parameters of the distribution, etc.) are analyzed by algorithms that recognize patterns and regularities in data, e.g., using artificial intelligence, pattern recognition, machine learning, statistical inference, neural nets, etc. In some embodiments, the analysis comprises use of a frequentist analysis and in some embodiments the analysis comprises use of a Bayesian analysis. In some embodiments, pattern recognition systems are trained using known "training" data (e.g., using supervised learning) and in some embodiments algorithms are used to discover previously unknown patterns (e.g., unsupervised learning). See, e.g., Duda, et al. (2001) *Pattern classification* (2nd edition), Wiley, New York; Bishop (2006) *Pattern Recognition and Machine Learning*, Springer.

Pattern recognition (e.g., using training sets, supervised learning, unsupervised learning, and analysis of unknown samples) associates identified patterns with analytes such that particular patterns provide a "fingerprint" of particular analytes that find use in detection, quantification, and identification of analytes.

In some embodiments, the distribution produced from a target analyte is significantly different than a distribution produced from a non-target analyte or the distribution produced in the absence of a target analyte. In some embodiments, a mean number of transitions is determined for the plurality of immobilized target analytes. In some embodiments, the mean number of transitions observed for a sample comprising a target analyte is approximately linearly related as a function of time and has a positive slope (e.g., the mean number of transitions increases approximately linearly as a function of time).

In some embodiments, the data are treated using statistics (e.g., Poisson statistics) to determine the probability of a transition occurring as a function of time at each discrete location on the solid support. In some particular embodiments, a relatively constant probability of a transition event occurring as a function of time at a discrete location on the solid support indicates the presence of a target analyte at said discrete location on the solid support. In some embodiments, a correlation coefficient relating event number and elapsed time is calculated from the probability of a transition event occurring as a function of time at a discrete location on the solid support. In some embodiments, a correlation coefficient relating event number and elapsed time greater than 0.95 when calculated from the probability of a transition event occurring as a function of time at a discrete location on the solid support indicates the presence of a target analyte at said discrete location on the solid support.

In some embodiments, dwell times of bound query probe ($\tau_{on}$) and unbound query probe ($\tau_{off}$) are used to identify the presence of a target analyte in a sample and/or to distinguish a sample comprising a target analyte from a sample comprising a non-target analyte and/or not comprising the target analyte. For example, the $\tau_{on}$ for a target analyte is greater than the $\tau_{on}$ for a non-target analyte; and, the $\tau_{off}$ for a target analyte is smaller than the $\tau_{off}$ for a non-target analyte. In some embodiments, measuring $\tau_{on}$ and $\tau_{off}$ for a negative control and for a sample indicates the presence or absence of the target analyte in the sample. In some embodiments, a plurality of $\tau_{on}$ and $\tau_{off}$ values is determined for each of a plurality of spots imaged on a solid support, e.g., for a control (e.g., positive and/or negative control) and a sample suspected of comprising a target analyte. In some embodiments, a mean $\tau_{on}$ and/or $\tau_{off}$ is determined for each of a plurality of spots imaged on a solid support, e.g., for a control (e.g., positive and/or negative control) and a sample suspected of comprising a target analyte. In some embodiments, a plot of $\tau_{on}$ versus $\tau_{off}$ (e.g., mean $\tau_{on}$ and $\tau_{off}$, time-averaged $\tau_{on}$ and $\tau_{off}$, etc.) for all imaged spots indicates the presence or absence of the target analyte in the sample.

Fluorescent Moieties

In some embodiments, a query probe and/or an analyte comprises a fluorescent moiety (e.g., a fluorogenic dye, also referred to as a "fluorophore" or a "fluor"). A wide variety of fluorescent moieties is known in the art and methods are known for linking a fluorescent moiety to analytes and/or query probes.

Examples of compounds that may be used as the fluorescent moiety include but are not limited to xanthene, anthracene, cyanine, porphyrin, and coumarin dyes. Examples of xanthene dyes that find use with the present technology include but are not limited to fluorescein, 6-carboxyfluorescein (6-FAM), 5-carboxyfluorescein (5-FAM), 5- or 6-carboxy-4, 7, 2', 7'-tetrachlorofluorescein (TET), 5- or 6-carboxy-4'5'2'4'5'7' hexachlorofluorescein (HEX), 5' or 6'-carboxy-4',5'-dichloro-2,'7'-dimethoxyfluorescein (JOE), 5-carboxy-2',4',5',7'-tetrachlorofluorescein (ZOE), rhodol, rhodamine, tetramethylrhodamine (TAMRA), 4,7-dlchlorotetramethyl rhodamine (DTAMRA), rhodamine X (ROX), and Texas Red. Examples of cyanine dyes that may find use with the present invention include but are not limited to Cy 3, Cy 3B, Cy 3.5, Cy 5, Cy 5.5, Cy 7, and Cy 7.5. Other fluorescent moieties and/or dyes that find use with the present technology include but are not limited to energy transfer dyes, composite dyes, and other aromatic compounds that give fluorescent signals. In some embodiments, the fluorescent moiety comprises a quantum dot.

In some embodiments, the fluorescent moiety comprises a fluorescent protein (e.g., a green fluorescent protein (GFP), a modified derivative of GFP (e.g., a GFP comprising S65T, an enhanced GFP (e.g., comprising F64L)), or others known in the art such as, e.g., blue fluorescent protein (e.g., EBFP, EBFP2, Azurite, mKalamal), cyan fluorescent protein (e.g., ECFP, Cerulean, CyPet, mTurquoise2), and yellow fluorescent protein derivatives (e.g., YFP, Citrine, Venus, YPet). Embodiments provide that the fluorescent protein may be covalently or noncovalently bonded to one or more query probes, analytes, and/or capture probes.

Fluorescent dyes include, without limitation, d-Rhodamine acceptor dyes including Cy 5, dichloro[R110], dichloro[R6G], dichloro[TAMRA], dichloro[ROX] or the like, fluorescein donor dyes including fluorescein, 6-FAM, 5-FAM, or the like; Acridine including Acridine orange, Acridine yellow, Proflavin, pH 7, or the like; Aromatic Hydrocarbons including 2-Methylbenzoxazole, Ethyl p-dimethylaminobenzoate, Phenol, Pyrrole, benzene, toluene, or the like; Arylmethine Dyes including Auramine O, Crystal violet, Crystal violet, glycerol, Malachite Green or the like; Coumarin dyes including 7-Methoxycoumarin-4-acetic acid, Coumarin 1, Coumarin 30, Coumarin 314, Coumarin 343, Coumarin 6 or the like; Cyanine Dyes including 1,1'-diethyl-2,2'-cyanine iodide, Cryptocyanine, Indocarbocyanine (C3) dye, Indodicarbocyanine (C5) dye, Indotricarbocyanine (C7) dye, Oxacarbocyanine (C3) dye, Oxadicarbocyanine (C5) dye, Oxatricarbocyanine (C7) dye, Pinacyanol iodide, Stains all, Thiacarbocyanine (C3) dye, ethanol, Thiacarbocyanine (C3) dye, n-propanol, Thiadicarbocyanine (C5) dye, Thiatricarbocyanine (C7) dye, or the like; Dipyrrin dyes including N,N'-Difluoroboryl-1,9-dimethyl-5-(4-iodophenyl)-dipyrrin, N,N'-Difluoroboryl-1,9-dimethyl-5-[(4-(2-trimethylsilylethynyl), N,N'-Difluoroboryl-1,9-dimethyl-5-phenydipyrrin, or the like; Merocyanines including 4-(dicyanomethylene)-2-methyl-6-(p-dimethylaminostyryl)-4H-pyran (DCM), acetonitrile, 4-(dicyanomethylene)-2-methyl-6-(p-dimethylaminostyryl)-4H-pyran (DCM), methanol, 4-Dimethylamino-4'-nitrostilbene, Merocyanine 540, or the like; Miscellaneous Dyes including 4',6-Diamidino-2-phenylindole (DAPI), dimethylsulfoxide, 7-Benzylamino-4-nitrobenz-2-oxa-1,3-diazole, Dansyl glycine, Dansyl glycine, dioxane, Hoechst 33258, DMF, Hoechst 33258, Lucifer yellow CH, Piroxicam, Quinine sulfate, Quinine sulfate, Squarylium dye III, or the like; Oligophenylenes including 2,5-Diphenyloxazole (PPO), Biphenyl, POPOP, p-Quaterphenyl, p-Terphenyl, or the like; Oxazines including Cresyl violet perchlorate, Nile Blue, methanol, Nile Red, ethanol, Oxazine 1, Oxazine 170, or the like; Polycyclic Aromatic Hydrocarbons including 9,10-Bis (phenylethynyl)anthracene, 9,10-Diphenylanthracene, Anthracene, Naphthalene, Perylene, Pyrene, or the like; polyene/polyynes including 1,2-diphenylacetylene, 1,4-diphenylbutadiene, 1,4-diphenylbutadiyne, 1,6-Diphenylhexatriene, Beta-carotene, Stilbene, or the like; Redox-active Chromophores including Anthraquinone, Azobenzene, Benzoquinone, Ferrocene, Riboflavin, Tris(2,2'-bipyridypruthenium(II), Tetrapyrrole, Bilirubin, Chlorophyll a, diethyl ether, Chlorophyll a, methanol, Chlorophyll b, Diprotonated-tetraphenylporphyrin, Hematin, Magnesium octaethylporphyrin, Magnesium octaethylporphyrin (MgOEP), Magnesium phthalocyanine (MgPc), PrOH, Magnesium phthalocyanine (MgPc), pyridine, Magnesium tetramesitylporphyrin (MgTMP), Magnesium tetraphenylporphyrin (MgTPP), Octaethylporphyrin, Phthalocyanine (Pc), Porphin, ROX, TAMRA, Tetra-t-butylazaporphine, Tetra-t-butylnaphthalocyanine, Tetrakis(2,6-dichlorophenyl)porphyrin, Tetrakis(o-aminophenyl)porphyrin, Tetramesitylporphyrin (TMP), Tetraphenylporphyrin (TPP), Vitamin B12, Zinc octaethylporphyrin (ZnOEP), Zinc phthalocyanine (ZnPc), pyridine, Zinc tetramesitylporphyrin (ZnTMP), Zinc tetramesitylporphyrin radical cation, Zinc tetraphenylporphyrin (ZnTPP), or the like; Xanthenes including Eosin Y, Fluorescein, basic ethanol, Fluorescein, ethanol, Rhodamine 123, Rhodamine 6G, Rhodamine B, Rose bengal, Sulforhodamine 101, or the like; or mixtures or combination thereof or synthetic derivatives thereof.

Several classes of fluorogenic dyes and specific compounds are known that are appropriate for particular embodiments of the technology: xanthene derivatives such as fluorescein, rhodamine, Oregon green, eosin, and Texas red; cyanine derivatives such as cyanine, indocarbocyanine, oxacarbocyanine, thiacarbocyanine, and merocyanine; naphthalene derivatives (dansyl and prodan derivatives); coumarin derivatives; oxadiazole derivatives such as pyridyloxazole, nitrobenzoxadiazole, and benzoxadiazole; pyrene derivatives such as cascade blue; oxazine derivatives such as Nile red, Nile blue, cresyl violet, and oxazine 170; acridine derivatives such as proflavin, acridine orange, and acridine yellow; arylmethine derivatives such as auramine, crystal violet, and malachite green; and tetrapyrrole derivatives such as porphin, phtalocyanine, bilirubin. In some embodiments the fluorescent moiety a dye that is xanthene, fluorescein, rhodamine, BODIPY, cyanine, coumarin, pyrene, phthalocyanine, phycobiliprotein, ALEXA FLUOR® 350, ALEXA FLUOR® 405, ALEXA FLUOR® 430, ALEXA FLUOR® 488, ALEXA FLUOR® 514, ALEXA FLUOR® 532, ALEXA FLUOR® 546, ALEXA FLUOR® 555, ALEXA FLUOR® 568, ALEXA FLUOR® 568, ALEXA FLUOR® 594, ALEXA FLUOR® 610, ALEXA FLUOR® 633, ALEXA FLUOR® 647, ALEXA FLUOR® 660, ALEXA FLUOR® 680, ALEXA FLUOR® 700, ALEXA FLUOR® 750, or a squaraine dye. In some embodiments, the label is a fluorescently detectable moiety as described in, e.g., Haugland (September 2005) MOLECULAR PROBES HANDBOOK OF FLUORESCENT PROBES AND RESEARCH CHEMICALS (10th ed.), which is herein incorporated by reference in its entirety.

In some embodiments the label (e.g., a fluorescently detectable label) is one available from ATTO-TEC GmbH (Am Eichenhang 50, 57076 Siegen, Germany), e.g., as described in U.S. Pat. Appl. Pub. Nos. 20110223677, 20110190486, 20110172420, 20060179585, and 20030003486; and in U.S. Pat. No. 7,935,822, all of which are incorporated herein by reference (e.g., ATTO 390, ATTO 425, ATTO 465, ATTO 488, ATTO 495, ATTO 514, ATTO 520, ATTO 532, ATTO Rho6G, ATTO 542, ATTO 550, ATTO 565, ATTO Rho3B, ATTO Rho11, ATTO Rho12, ATTO Thio12, ATTO Rho101, ATTO 590, ATTO 594, ATTO Rho13, ATTO 610, ATTO 620, ATTO Rho14, ATTO 633, ATTO 647, ATTO 647N, ATTO 655, ATTO Oxa12, ATTO 665, ATTO 680, ATTO 700, ATTO 725, ATTO740).

One of ordinary skill in the art will recognize that dyes having emission maxima outside these ranges may be used as well. In some cases, dyes ranging between 500 nm to 700 nm have the advantage of being in the visible spectrum and can be detected using existing photomultiplier tubes. In some embodiments, the broad range of available dyes allows selection of dye sets that have emission wavelengths that are spread across the detection range. Detection systems capable of distinguishing many dyes are known in the art.

Methods

Some embodiments provide a method of identifying an analyte by repetitive query probe binding. In some embodiments, methods comprise immobilizing an analyte to a solid support. In some embodiments, the solid support is a surface (e.g., a substantially planar surface, a rounded surface), e.g., a surface in contact with a bulk solution, e.g., a bulk solution comprising analyte. In some embodiments, the solid support is a freely diffusible solid support (e.g., a bead, a colloidal particle, e.g., a colloidal particle having a diameter of approximately 10-1000 nm (e.g., 10, 20, 30, 40, 50, 60, 70, 80, 90, 100, 110, 120, 130, 140, 150, 200, 250, 300, 350, 400, 450, 500, 550, 600, 650, 700, 750, 800, 850, 900, 950, or 1000 nm)), e.g., that freely diffuses within the bulk solution, e.g., a bulk solution comprising the analyte. In some embodiments, immobilizing an analyte to a solid support comprises covalent interaction between the solid support and analyte. In some embodiments, immobilizing an analyte to a solid support comprises non-covalent interaction between the solid support and analyte. In some embodiments, the analyte (e.g., a molecule, e.g., a molecule such as, e.g., a protein, peptide, nucleic acid, small molecule, lipid, metabolite, drug, etc.) is stably immobilized to a surface and methods comprise repetitive (e.g., transient, low-affinity) binding of a query probe to the target analyte. In some embodiments, methods comprise detecting the repetitive (e.g., transient, low-affinity) binding of a query probe to the target analyte. In some embodiments, methods comprise generating a dataset comprising a signal produced from query probe binding to the analyte (e.g., a dataset of query probe signal as a function of time) and information (e.g., coordinates, e.g., x, y coordinates) describing the spatial position on the surface of the query probe binding to the analyte. In some embodiments, the dataset is processed (e.g., manipulated, transformed, visualized, etc.), e.g., to improve the spatial resolution of the query probe binding events. For example, in particular embodiments, the dataset (e.g., comprising query probe signal as a function of time and information (e.g., coordinates, e.g., x, y coordinates) describing the spatial position on the surface of the query probe binding to the analyte) is subjected to processing. In some embodiments, the processing comprises a frame-by-frame subtraction process to generate differential intensity profiles showing query probe binding or dissociation events within each frame of the time series data. Data collected during the development of the technology described herein indicate that the differential intensity profiles have a higher resolution than the query probe binding signal vs. position map. In some embodiments, after determining the spatial position (e.g., x, y coordinates) of each query probe binding and/or dissociation event, a plurality of events is clustered according to spatial position and the kinetics of the events within each cluster are subjected to statistical analysis to determine whether the cluster of events originates from a given target analyte.

For instance, some embodiments of methods for quantifying one or more surface-immobilized or diffusing target analytes comprise one or more steps including, e.g., measuring the signal of one or more transiently binding query probes to the immobilized target analyte(s) with single-molecule sensitivity. In some embodiments, methods comprise tracking (e.g., detecting and/or recording the position of) target analytes independently from query probe binding. In some embodiments, the methods further comprise calculating the time-dependent probe binding signal intensity changes at the surface as a function of position (e.g., x, y position). In some embodiments, calculating the time-dependent query probe binding signal intensity changes at the surface as a function of position (e.g., x, y position) produces a "differential intensity profile" for query probe binding to the analyte. In some embodiments, the methods comprise determining the position (e.g., x, y position) of each query probe binding and dissociation event ("event") with sub-pixel accuracy from a differential intensity profile. In some embodiments, methods comprise grouping events into local clusters by position (e.g., x, y position) on the surface, e.g., to associate events for a single immobilized target analyte. In some embodiments, the methods comprise calculating kinetic parameters from each local cluster of events to determine whether the cluster originates from a particular analyte, e.g., from transient probe binding to a particular analyte.

Embodiments of methods are not limited in the analyte that is detected. For example, in some embodiments the analyte is polypeptide, e.g., a protein or a peptide. In some embodiments, the target analyte is a nucleic acid. In some embodiments, the target analyte is a small molecule.

In some embodiments, the interaction between the target analyte and the query probe is distinguishably influenced by a covalent modification of the target analyte. For example, in some embodiments, the analyte is a polypeptide comprising a post-translational modification, e.g., a protein or a peptide comprising a post-translational modification. In some embodiments, a post-translational modification of a polypeptide affects the transient binding of a query probe with the analyte, e.g., the query probe signal is a function of the presence or absence of the post-translational modification on the polypeptide. For example, in some embodiments, the analyte is a nucleic acid comprising an epigenetic modification, e.g., a nucleic acid comprising a methylated base. In some embodiments, the analyte is a nucleic acid comprising a covalent modification to a nucleobase, a ribose, or a deoxyribose moiety of the target analyte.

In some embodiments, a modification of a nucleic acid affects the transient binding of a query probe with the analyte, e.g., the query probe signal is a function of the presence or absence of the modification on the nucleic acid.

In some embodiments, the transient interaction between the post-translational modification and the query probe is mediated by a chemical affinity tag, e.g., a chemical affinity tag comprising a nucleic acid.

In some embodiments, the query probe is a nucleic acid or an aptamer.

In some embodiments, the query probe is a low-affinity antibody, antibody fragment, or nanobody.

In some embodiments, the query probe is a DNA-binding protein, RNA-binding protein, or a DNA-binding ribonucleoprotein complex.

In some embodiments, the position, e.g., the (x, y) position, of each binding or dissociation event is determined by subjecting the differential intensity profile to centroid determination, least squares fitting to a Gaussian function, least-square fitting to an Airy disk function, least-squares fitting to a polynomial function (e.g., a parabola), or maximum likelihood estimation.

In some embodiments, the capture probe is a high-affinity antibody, antibody fragment, or nanobody. In some embodiments, the capture probe is a nucleic acid. In some embodiments, capture is mediated by a covalent bond cross-linking the target analyte to the surface. In some embodiments, the target analyte is subjected to thermal denaturation in the presence of a carrier prior to surface immobilization. In some embodiments, the analyte is subjected to chemical denaturation in the presence of a carrier prior to surface immobilization, e.g., the analyte is denatured with a denaturant such as urea, formamide, guanidinium chloride, high ionic strength, low ionic strength, high pH, low pH, or sodium dodecyl sulfate (SDS).

Super-Resolution Imaging

The technology provides a super-resolution identification, detection, quantification, and/or characterization of analytes based on transformation of signals produced by transient binding of query probes to analytes into data providing information relating to the identification, detection, quantification, and/or characterization of analytes. Some embodiments comprise one or more steps as described herein, e.g., one or more ordered steps as described herein. In some embodiments, one or more steps depend on and follow one or more other steps; however, some embodiments comprise one or more of the described steps without respect to any particular order.

As used herein, the term "dataset" or "movie" relates to data comprising a time series of sensor array data (e.g., from a CCD, intensified CCD, electron multiplying CCD, CMOS sensor, or the like), wherein each time point of the time series of sensor array data (or "frame") comprises a set of signal intensity values as a function of position (e.g., x, y coordinates) within the sensor array. In some embodiments, the (x, y) position refers to the coordinates of sensor elements (e.g., pixels) in the horizontal (x) and vertical (y) directions within the two-dimensional sensor array, e.g., in a frame of a movie dataset.

In some embodiments, a dataset as described is collected from a sample comprising query probes (e.g., some embodiments comprise collecting a dataset from a sample comprising query probes). In some embodiments, the sample comprises analyte. In some embodiments, the sample is believed to comprise analyte. In some embodiments, it is not known if the sample comprises analyte.

In some embodiments, one or more frames of a dataset are corrected, e.g., for lateral drift of the imaging surface with respect to the sensor that results in apparent (x, y) movement of the imaging surface (e.g., some embodiments optionally comprise correcting for drift of the imaging surface with respect to the sensor). For example, most optical microscopes exhibit stage drift that causes a projected image to move (e.g., several nanometers to several micrometers) during the course of acquiring a movie, resulting in apparent movement of an object that is in fact stationary with respect to the imaging surface (e.g., one or more frames of the movie are out of register with one or more other frames of the movie). In some embodiments, when datasets are not corrected, the resolution of the technology is decreased, which renders subsequent clustering operations more challenging by broadening the distribution of apparent (x, y) positions of query probe binding events to a single immobilized target analyte. In some embodiments, methods for drift correction include, but are not limited to, e.g., use of fiducial markers whose position is independently measured (e.g., using the same sensor used to detect query probe binding and/or using other, independent sensors that are not used to detect query probe binding). In some embodiments, the positions of one or more fiducial markers is tracked over time to determine the extent and direction of (x, y) drift in each movie frame. In some embodiments, each frame N of the movie is analyzed to determine the (x, y) offset that provides maximal correlation of pixel intensity values of frame N with the intensity values of frame 1 (the first frame of the movie).

Some embodiments comprise generating a differential intensity map movie. For example, some embodiments comprise subtracting the intensity value of each pixel P in each frame N of the movie from the corresponding intensity value of the same pixel P in the next frame N+1 of the movie. The result of these subtractions is a time series of differential intensity maps comprising one fewer frame than the original movie. Some embodiments comprise subtracting the intensity value of each pixel P in each frame N of the movie from the corresponding intensity value of the same pixel P in frame N+2, N+3, N+4, N+n of the movie to produce a time series of differential intensity maps comprising 2, 3, 4, or n fewer frames than the original movie.

Some embodiments comprise recording one or more of the position, intensity, and/or frame number of each intensity maximum (e.g., corresponding to query probe binding events) within each frame of the differential intensity map. In some embodiments, the position is determined by a transformation of the data comprising, e.g., a two-dimensional Gaussian fitting, a centroid fitting, or other methods that are used to determine the position of a particle, e.g., in some embodiments with an error of 1 pixel or less.

Some embodiments comprise recording one or more of the position, intensity (e.g., absolute value of the intensity), and/or frame number of each intensity minimum (e.g., corresponding to query probe dissociation events) within each frame of the differential intensity map. In some embodiments, the position is determined by a transformation of the data comprising, e.g., a two-dimensional Gaussian fitting, a centroid fitting, or other methods that are used to determine the position of a particle, e.g., in some embodiments with an error of 1 pixel or less.

Some embodiments optionally comprise applying the drift correction calculated in step to the series of (x, y) positions determined from the differential intensity map (e.g., some embodiments comprise correcting the series of (x, y) positions determined from the differential intensity map for lateral drift, e.g., as described above).

Some embodiments comprise combining (x, y) positions of intensity maxima and/or intensity minima. Some embodiments further comprise performing clustering analysis (e.g., hierarchical clustering) on the (x, y) positions of intensity maxima and/or intensity minima to identify regions of high density of query probe binding and dissociation events. In some embodiments, the clustering analysis produces clusters wherein each cluster contains 1 or more binding and/or dissociation event(s) that are detected within a limited region of the sensor.

In some embodiments, optionally, if multiple intensity maxima (or multiple intensity minima) are identified in consecutive frames of the differential intensity map within each cluster, the multiple intensity maxima (or multiple intensity minima) are assumed to correspond to the same binding event (or dissociation event) and are combined by averaging their (x, y) positions of the multiple intensity maxima (or multiple intensity minima) and summing the intensity values of the multiple intensity maxima (or multiple intensity minima).

Some embodiments comprise calculating one or more statistical measures for the events within each cluster, including but not limited to, the number of query probe binding and/or dissociation events; one or more of the mean, median, maximum, minimum, range, and standard deviation of the number of frames between a given binding event and the next dissociation event; one or more of the mean, median, maximum, minimum, range, and standard deviation of the number of frames between a given dissociation event and the next binding event; one or more of the mean, median, maximum, minimum, range, and standard deviation of the (x, y) position of query probe binding and dissociation events; and/or one or more of the mean, median, maximum, minimum, range, and standard deviation of the signal intensity change associated with query probe binding and dissociation events.

Some embodiments comprise comparing the statistics measured as described above for each cluster of query probe binding events to statistics measured using a standard reference material (e.g., a positive control). Some embodiments comprise comparing the statistics measured as described above for each cluster of query probe binding events to statistics measured using a negative control (e.g., a comprising no analyte, a substance closely related to the analyte, an analyte comprising a modification and/or not comprising a modification, etc.). In some embodiments, comparing the statistics measured as described above for each cluster of query probe binding events to statistics measured using a standard reference material and/or a negative control is used to determine whether the cluster of query probe binding events is probable to have originated from query probe binding to a single molecule of the target analyte.

Some embodiments comprise calculating the number of clusters in the dataset that represent query probe binding to the target analyte. In some embodiments, calculating the number of clusters in the dataset that represent query probe binding to the target analyte comprises using one or more of the statistical tests described above. In some embodiments, calculating the number of clusters in the dataset that represent query probe binding to the target analyte provides a measure of the number of analytes (e.g., the apparent number of analytes) present in the region of the imaging surface that was assayed by the method. In some embodiments, calculating the number of clusters in the dataset that represent query probe binding to the target analyte provides a measure of the concentration of analyte, provides an indication that the analyte is present or absent in the sample, and/or provides an indication of the state (e.g., modified, not modified) of the analyte in the sample.

Some embodiments optionally comprise comparing the apparent number, concentration, state, presence, or absence of analyte as described above to a previously determined value of apparent number, concentration, state, presence, or absence of analyte for a known analyte concentration. Some embodiments comprise use of a standard curve (e.g., generated with one or more compositions comprising a standard reference material of the target analyte having known concentrations) to determine the concentration of the target analyte in the sample.

In some embodiments, steps of the described methods are implemented in software code, e.g., a series of procedural steps instructing a computer and/or a microprocessor to produce and/or transform data as described above. In some embodiments, software instructions are encoded in a programming language such as, e.g., BASIC, C, C++, Java, MATLAB, Mathematica, Perl, Python, or R.

In some embodiments, one or more steps or components of the super-resolution identification, detection, quantification, and/or characterization of analytes are provided in individual software objects connected in a modular system. In some embodiments, the software objects are extensible and portable. In some embodiments, the objects comprise data structures and operations that transform the object data. In some embodiments, the objects are used by manipulating their data and invoking their methods. Accordingly, embodiments provide software objects that imitate, model, or provide concrete entities, e.g., for numbers, shapes, data structures, that are manipulable. In some embodiments, software objects are operational in a computer or in a microprocessor. In some embodiments, software objects are stored on a computer readable medium.

In some embodiments, a step of a method described herein is provided as an object method. In some embodiments, data and/or a data structure described herein is provided as an object data structure.

Some embodiments provide an object-oriented pipeline for processing a time series of sensor array data, e.g., comprising one or more software objects, to produce a drift-corrected dataset and/or a differential intensity map movie; to identify one or more of the position, intensity, and/or frame number of one or more intensity maxima and/or intensity minima; to transform data, e.g., using a two-dimensional Gaussian fitting, a centroid fitting, or other methods that are used to determine the position of a particle; to correct the series of (x, y) positions determined from the differential intensity map for lateral drift; to combine (x, y) positions of intensity maxima and/or intensity minima; to sum the intensity values of the multiple intensity maxima (or multiple intensity minima); to calculate one or more statistical measures for the events within each cluster; to compare the statistics measured as described above for each cluster of query probe binding events to statistics measured using a standard reference material and/or to a negative control; to calculate the number of clusters in the dataset that represent query probe binding to the target analyte, e.g., to produce a measure of the number of analytes (e.g., the apparent number of analytes) present in the region of the imaging surface that was assayed by the method, a measure of the concentration of analyte, an indication that the analyte is present or absent in the sample, and/or an indication of the state of the analyte in the sample; and/or to compare the apparent number, concentration, state, presence, or absence of analyte as described above to a previously determined value of apparent number, concentration, state, presence, or absence of analyte for a known analyte concentration.

Embodiments comprise use of code that produces and manipulates software objects, e.g., as encoded using a language such as but not limited to Java, C++, C#, Python, PHP, Ruby, Perl, Object Pascal, Objective-C, Swift, Scala, Common Lisp, and Smalltalk.

Systems

Embodiments of the technology relate to systems for detecting analytes. For example, in some embodiments, the technology provides a system for quantifying one or more target analytes, wherein the system comprises a surface-bound capture probe or a surface-bound moiety that stably binds the target analyte. In some embodiments, the surface-bound capture probe or the surface-bound moiety stably binds the analyte via a binding site, a epitope, or a recognition site (e.g., a first binding site, a first epitope, or a first recognition site). In some embodiments, systems further comprise a query probe that binds the target analyte with a low affinity at a second binding site, a second epitope, or a second recognition site. In some embodiments, the query probe is freely diffusible in the bulk solution contacting the surface of the system. Furthermore, some system embodiments comprise a detection component that records a signal from the interaction of the query probe with the target analyte. For example, in some embodiments the detection component records the change in the signal as a function of time produced from the interaction of the query probe with the target analyte. In some embodiments, the detection component records the spatial position (e.g., as an x, y coordinate pair) and intensity of binding and dissociation events of the query probe to and from said target analyte. In some embodiments, the detection component records the spatial position (e.g., as an x, y coordinate pair) and the beginning and/or ending time of binding and dissociation events of the query probe to and from said target analyte. In some embodiments, the detection component records the spatial position (e.g., as an x, y coordinate pair) and the length of time of binding and dissociation events of the query probe to and from said target analyte.

System embodiments comprise analytical processes (e.g., embodied in a set of instructions, e.g., encoded in software, that direct a microprocessor to perform the analytical processes) to identify an individual molecule of the target analyte. In some embodiments, analytical processes use the spatial position data and timing (e.g., start, end, or length of time) of repeated binding and dissociation events to said target analyte as input data.

Embodiments of systems are not limited in the analyte that is detected. For example, in some embodiments the analyte is polypeptide, e.g., a protein or a peptide. In some embodiments, the target analyte is a nucleic acid. In some embodiments, the target analyte is a small molecule.

In some embodiments, the interaction between the target analyte and the query probe is distinguishably influenced by a covalent modification of the target analyte. For example, in some embodiments, the analyte is a polypeptide comprising a post-translational modification, e.g., a protein or a peptide comprising a post-translational modification. In some embodiments, a post-translational modification of a polypeptide affects the transient binding of a query probe with the analyte, e.g., the query probe signal is a function of the presence or absence of the post-translational modification on the polypeptide. For example, in some embodiments, the analyte is a nucleic acid comprising an epigenetic modification, e.g., a nucleic acid comprising a methylated base. In some embodiments, a modification of a nucleic acid affects the transient binding of a query probe with the analyte, e.g., the query probe signal is a function of the presence or absence of the modification on the nucleic acid.

In some embodiments, the transient interaction between the post-translational modification and the query probe is mediated by a chemical affinity tag, e.g., a chemical affinity tag comprising a nucleic acid.

In some embodiments, the query probe is a nucleic acid or an aptamer.

In some embodiments, the query probe is a low-affinity antibody, antibody fragment, or nanobody.

In some embodiments, the query probe is a DNA-binding protein, RNA-binding protein, or a DNA-binding ribonucleoprotein complex.

In some embodiments, the analyte is a nucleic acid comprising a covalent modification to a nucleobase, a ribose, or a deoxyribose moiety of the target analyte.

In some embodiments, the capture probe is a high-affinity antibody, antibody fragment, or nanobody. In some embodiments, the capture probe is a nucleic acid. In some embodiments, capture is mediated by a covalent bond cross-linking the target analyte to the surface. In some embodiments, the target analyte is subjected to thermal denaturation in the presence of a carrier prior to surface immobilization. In some embodiments, the analyte is subjected to chemical denaturation in the presence of a carrier prior to surface immobilization, e.g., the analyte is denatured with a denaturant such as urea, formamide, guanidinium chloride, high ionic strength, low ionic strength, high pH, low pH, or sodium dodecyl sulfate (SDS).

Some system embodiments of the technology comprise components for the detection and quantification of a target analyte. Systems according to the technology comprise, e.g., a solid support (e.g., a microscope slide, a coverslip, an avidin (e.g., streptavidin)-conjugated microscope slide or coverslip, a solid support comprising a zero mode waveguide array, or the like), and a query probe as described herein.

Some system embodiments comprise a detection component that is a fluorescence microscope comprising an illumination configuration to excite bound query probes (e.g., a prism-type total internal reflection fluorescence (TIRF) microscope, an objective-type TIRF microscope, a near-TIRF or HiLo microscope, a confocal laser scanning microscope, a zero-mode waveguide, and/or an illumination configuration capable of parallel monitoring of a large area of the slide or coverslip (>100 $\mu m^2$) while restricting illumination to a small region of space near the surface). Some embodiments comprise a fluorescence detector, e.g., a detector comprising an intensified charge coupled device (ICCD), an electron-multiplying charge coupled device (EM-CCD), a complementary metal-oxide-semiconductor (CMOS), a photomultiplier tube (PMT), an avalanche photodiode (APD), and/or another detector capable of detecting fluorescence emission from single chromophores. Some particular embodiments comprise a component configured for lens-free imaging, e.g., a lens-free microscope, e.g., a detection and/or imaging component for directly imaging on a detector (e.g., a CMOS) without using a lens.

Some embodiments comprise a computer and software encoding instructions for the computer to perform, e.g., to control data acquisition and/or analytical processes for processing data.

Some embodiments comprise optics, such as lenses, mirrors, dichroic mirrors, optical filters, etc., e.g., to detect fluorescence selectively within a specific range of wavelengths or multiple ranges of wavelengths.

For example, in some embodiments, computer-based analysis software is used to translate the raw data generated by the detection assay (e.g., the presence, absence, or amount of one or more analytes, e.g., as a function time and/or position (e.g., x, y coordinates) on the surface) into data of predictive value for a clinician. The clinician can access the predictive data using any suitable means.

Some system embodiments comprise a computer system upon which embodiments of the present technology may be implemented. In various embodiments, a computer system includes a bus or other communication mechanism for communicating information and a processor coupled with the bus for processing information. In various embodiments, the computer system includes a memory, which can be a random access memory (RAM) or other dynamic storage device, coupled to the bus, and instructions to be executed by the processor. Memory also can be used for storing temporary variables or other intermediate information during execution of instructions to be executed by the processor. In various embodiments, the computer system can further include a read only memory (ROM) or other static storage device coupled to the bus for storing static information and instructions for the processor. A storage device, such as a magnetic disk or optical disk, can be provided and coupled to the bus for storing information and instructions.

In various embodiments, the computer system is coupled via the bus to a display, such as a cathode ray tube (CRT) or a liquid crystal display (LCD), for displaying information to a computer user. An input device, including alphanumeric and other keys, can be coupled to the bus for communicating information and command selections to the processor. Another type of user input device is a cursor control, such as a mouse, a trackball, or cursor direction keys for communicating direction information and command selections to the processor and for controlling cursor movement on the display. This input device typically has two degrees of freedom in two axes, a first axis (e.g., x) and a second axis (e.g., y), that allows the device to specify positions in a plane.

A computer system can perform embodiments of the present technology. Consistent with certain implementations of the present technology, results can be provided by the computer system in response to the processor executing one or more sequences of one or more instructions contained in the memory. Such instructions can be read into the memory from another computer-readable medium, such as a storage device. Execution of the sequences of instructions contained in the memory can cause the processor to perform the methods described herein. Alternatively, hard-wired circuitry can be used in place of or in combination with software instructions to implement the present teachings. Thus, implementations of the present technology are not limited to any specific combination of hardware circuitry and software.

The term "computer-readable medium" as used herein refers to any media that participates in providing instructions to the processor for execution. Such a medium can take many forms, including but not limited to, non-volatile media, volatile media, and transmission media. Examples of non-volatile media can include, but are not limited to, optical or magnetic disks, such as a storage device. Examples of volatile media can include, but are not limited to, dynamic memory. Examples of transmission media can include, but are not limited to, coaxial cables, copper wire, and fiber optics, including the wires that comprise the bus.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

Various forms of computer readable media can be involved in carrying one or more sequences of one or more instructions to the processor for execution. For example, the instructions can initially be carried on the magnetic disk of a remote computer. The remote computer can load the instructions into its dynamic memory and send the instructions over a network connection (e.g., a LAN, a WAN, the internet, a telephone line). A local computer system can receive the data and transmit it to the bus. The bus can carry the data to the memory, from which the processor retrieves and executes the instructions. The instructions received by the memory may optionally be stored on a storage device either before or after execution by the processor.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

In accordance with such a computer system, some embodiments of the technology provided herein further comprise functionalities for collecting, storing, and/or analyzing data (e.g., presence, absence, concentration of an analyte). For example, some embodiments contemplate a system that comprises a processor, a memory, and/or a database for, e.g., storing and executing instructions, analyzing fluorescence, image data, performing calculations using the data, transforming the data, and storing the data. It some embodiments, an algorithm applies a statistical model (e.g., a Poisson model or hidden Markov model) to the data.

Many diagnostics involve determining the presence of, or a nucleotide sequence of, one or more nucleic acids.

In some embodiments, an equation comprising variables representing the presence, absence, concentration, amount, or sequence properties of one or more analytes produces a value that finds use in making a diagnosis or assessing the presence or qualities of an analyte. As such, in some embodiments this value is presented by a device, e.g., by an indicator related to the result (e.g., an LED, an icon on a display, a sound, or the like). In some embodiments, a device stores the value, transmits the value, or uses the value for additional calculations. In some embodiments, an equation comprises variables representing the presence, absence, concentration, amount, or properties of one or more analytes.

Thus, in some embodiments, the present technology provides the further benefit that a clinician, who is not likely to be trained in analytical assays, need not understand the raw data. The data are presented directly to the clinician in its most useful form. The clinician is then able to utilize the information to optimize the care of a subject. The present technology contemplates any method capable of receiving, processing, and transmitting the information to and from laboratories conducting the assays, information providers, medical personal, and/or subjects. For example, in some embodiments of the present technology, a sample is obtained from a subject and submitted to a profiling service (e.g., a clinical lab at a medical facility, genomic profiling business, etc.), located in any part of the world (e.g., in a country different than the country where the subject resides or where the information is ultimately used) to generate raw data. Where the sample comprises a tissue or other biological sample, the subject may visit a medical center to have the sample obtained and sent to the profiling center or subjects may collect the sample themselves and directly send it to a profiling center. Where the sample comprises previously determined biological information, the information may be directly sent to the profiling service by the subject (e.g., an information card containing the information may be scanned by a computer and the data transmitted to a computer of the profiling center using electronic communication systems). Once received by the profiling service, the sample is processed and a profile is produced that is specific for the diagnostic or prognostic information desired for the subject. The profile data are then prepared in a format suitable for interpretation by a treating clinician. For example, rather than providing raw expression data, the prepared format may represent a diagnosis or risk assessment for the subject, along with recommendations for particular treatment options. The data may be displayed to the clinician by any suitable method. For example, in some embodiments, the profiling service generates a report that can be printed for the clinician (e.g., at the point of care) or displayed to the clinician on a computer monitor. In some embodiments, the information is first analyzed at the point of care or at a regional facility. The raw data are then sent to a central processing facility for further analysis and/or to convert the raw data to information useful for a clinician or patient. The central processing facility provides the advantage of privacy (all data are stored in a central facility with uniform security protocols), speed, and uniformity of data analysis. The central processing facility can then control the fate of the data following treatment of the subject. For example, using an electronic communication system, the central facility can provide data to the clinician, the subject, or researchers. In some embodiments, the subject is able to access the data using the electronic communication system. The subject may chose further intervention or counseling based on the results. In some embodiments, the data are used for research use. For example, the data may be used to further optimize the inclusion or elimination of markers as useful indicators of a particular condition associated with the disease.

Samples

In some embodiments, analytes are isolated from a biological sample. Analytes can be obtained from any material (e.g., cellular material (live or dead), extracellular material, viral material, environmental samples (e.g., metagenomic samples), synthetic material (e.g., amplicons such as provided by PCR or other amplification technologies)), obtained from an animal, plant, bacterium, archaeon, fungus, or any other organism. Biological samples for use in the present technology include viral particles or preparations thereof. Analytes can be obtained directly from an organism or from a biological sample obtained from an organism, e.g., from blood, urine, cerebrospinal fluid, seminal fluid, saliva, sputum, stool, hair, sweat, tears, skin, and tissue. Exemplary samples include, but are not limited to, whole blood, lymphatic fluid, serum, plasma, buccal cells, sweat, tears, saliva, sputum, hair, skin, biopsy, cerebrospinal fluid (CSF), amniotic fluid, seminal fluid, vaginal excretions, serous fluid, synovial fluid, pericardial fluid, peritoneal fluid, pleural fluid, transudates, exudates, cystic fluid, bile, urine, gastric fluids, intestinal fluids, fecal samples, and swabs, aspirates (e.g., bone marrow, fine needle, etc.), washes (e.g., oral, nasopharyngeal, bronchial, bronchialalveolar, optic, rectal, intestinal, vaginal, epidermal, etc.), breath condensate, and/or other specimens.

Any tissue or body fluid specimen may be used as a source of analytes for use in the technology, including forensic specimens, archived specimens, preserved specimens, and/or specimens stored for long periods of time, e.g., fresh-frozen, methanol/acetic acid fixed, or formalin-fixed paraffin embedded (FFPE) specimens and samples. Analytes can also be isolated from cultured cells, such as a primary cell culture or a cell line. The cells or tissues from which analytes are obtained can be infected with a virus or other intracellular pathogen. A sample can also be total RNA extracted from a biological specimen, a cDNA library, viral, or genomic DNA. A sample may also be isolated DNA from a non-cellular origin, e.g. amplified/isolated DNA that has been stored in a freezer.

Analytes (e.g., nucleic acid molecules, polypeptides, lipids) can be obtained, e.g., by extraction from a biological sample, e.g., by a variety of techniques such as those described by Maniatis, et al. (1982) Molecular Cloning: A Laboratory Manual, Cold Spring Harbor, N.Y. (see, e.g., pp. 280-281).

In some embodiments, the technology provides for the size selection of analytes, e.g., to provide a defined size range of molecules including the target analytes.

Uses

Various embodiments relate to the detection of a wide range of analytes. For example, in some embodiments the technology finds use in detecting a nucleic acid (e.g., a DNA or RNA). In some embodiments, the technology finds use in detecting a nucleic acid comprising a particular target sequence. In some embodiments, the technology finds use in detecting a nucleic acid comprising a particular mutation (e.g., a single nucleotide polymorphism, an insertion, a deletion, a missense mutation, a nonsense mutation, a genetic rearrangement, a gene fusion, etc.). In some embodiments, the technology finds use in detection a polypeptide (e.g., a protein, a peptide). In some embodiments, the technology finds use in detecting a polypeptide encoded by a nucleic acid comprising a mutation (e.g., a polypeptide comprising a substitution, a truncated polypeptide, a mutant or variant polypeptide).

In some embodiments, the technology finds use in detecting post-translational modifications to polypeptides (e.g., phosphorylation, methylation, acetylation, glycosylation (e.g., O-linked glycosylation, N-linked glycosylation, ubiquitination, attachment of a functional group (e.g., myristoylation, palmitoylation, isoprenylation, prenylation, farnesylation, geranylation, geranylgeranylation, glypiation, glycosylphosphatidylinositol (GPI) anchor formation), hydroxylation, biotinylation, pegylation, oxidation, SUMOylation, disulfide bridge formation, disulfide bridge cleavage, proteolytic cleavage, amidation, sulfation, pyrrolidone carboxylic acid formation. In some embodiments, the technology finds use in the detection of the loss of these features, e.g., dephosporylation, demethylation, deacetylation, deglycosylation, deamidation, dehydroxylation, deubiquitination, etc. In some embodiments, the technology finds use in detecting epigenetic modifications to DNA or RNA (e.g., methylation (e.g., methylation of CpG sites), hydroxymethylation). In some embodiments, the technology finds use in detecting the loss of these features, e.g., demethylation of DNA or RNA, etc. In some embodiments, the technology finds use in detecting alterations in chromatin structure, nucleosome structure, histone modification, etc., and in detecting damage to nucleic acids.

In some embodiments, the technology finds use as a molecular diagnostic assay, e.g., to assay samples having small specimen volumes (e.g., a droplet of blood, e.g., for mail-in service). In some embodiments, the technology provides for the early detection of cancer or infectious disease using sensitive detection of very low-abundance analyte biomarkers. In some embodiments, the technology finds use in molecular diagnostics to assay epigenetic modifications of protein biomarkers (e.g., post-translational modifications).

In some embodiments, the technology finds use in characterizing multimolecular complexes (e.g., characterizing one or more components of a multimolecular complex), e.g., a multiprotein complex, a nucleic acid/protein complex, a molecular machine, an organelle (e.g., a cell-free mitochondrion, e.g., in plasma), cell, virus particle, organism, tissue, or any macromolecular structure or entity that can be captured and is amenable to analysis by the technology described herein. For example, in some embodiments a multimolecular complex is isolated and the technology finds use in characterizing, identifying, quantifying, and/or detecting one or more molecules (analytes) associated with the multimolecular complex. In some embodiments an extracellular vesicle is isolated and the technology finds use in characterizing, identifying, quantifying, and/or detecting one or more molecules (analytes) associated with the vesicle. In some embodiments, the technology finds use in characterizing, identifying, quantifying, and/or detecting a protein (e.g., a surface protein) and/or an analytes present inside the vesicle, e.g., a protein, nucleic acid, or other analyte described herein. In some embodiments, the vesicle is fixed and permeabilized prior to analysis.

EXAMPLES

Example 1

Identifying Surface-Immobilized Targets Via Repetitive Query Probe Binding

During the development of embodiments of the technology described herein, experiments were conducted in which a target analyte (e.g., a molecule such as a protein, a peptide, a nucleic acid, etc.) was stably immobilized to a surface. Then, a low-affinity probe was added and repetitive binding of the low-affinity query probe to the target analyte was detected and recorded to generate a dataset of query probe signal vs. spatial position on the surface (see FIG. 1).

During the experiments, data were collected comprising a time series of query probe signal (association (binding of query probe to analyte) and dissociation events) versus position on the surface. These data were analyzed suing a method of frame-by-frame subtraction to generate differential intensity profiles showing the query probe binding or dissociation events within each frame. The differential intensity profiles produced by this treatment of the data yielded intensity minima and maxima that were better resolved than the intensity maxima within the initial signal versus position map. After determining the position (e.g., using x, y coordinates) of each event, all events are clustered according to spatial position and the kinetics of events within each cluster are subjected to statistical analysis to determine whether the cluster of events originates from a given target analyte (FIG. 1).

Example 2

Comparison with Other Imaging Methods

Figure 2:
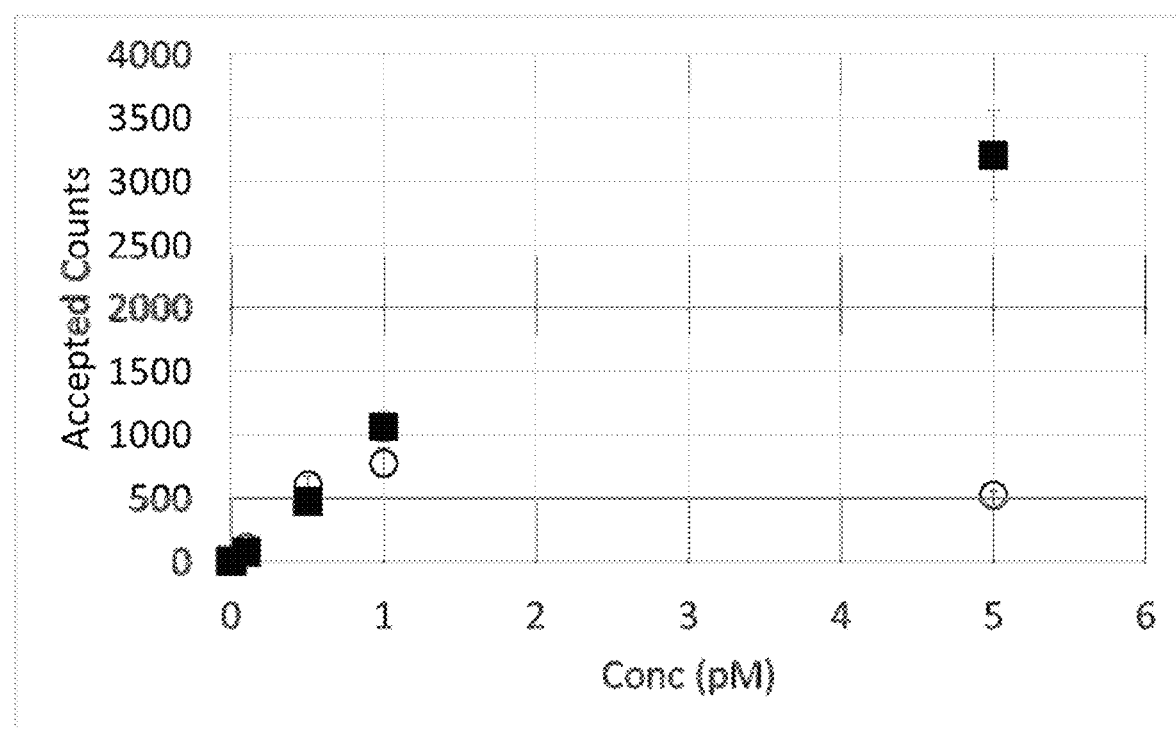
FIG. 2 is a plot of signal ("Accepted counts") versus concentration in picomolar units for data collected during experiments described herein. The plot indicates that the dynamic range of the technology as described herein (filled squares) is improved relative to prior methods (open circles).

During the development of embodiments of the technology described herein, experiments were conducted to compare data collected using the technology described herein with other imaging technologies. In particular, DNA analytes were immobilized to a surface and imaged using the super-resolution imaging and event clustering as described herein (see, e.g., Example 1). As shown in FIG. 2, the present technology provides an improvement in the dynamic range of measurement of a DNA target analyte present in the picomolar range when using the presently described super-resolution imaging and event clustering from differential intensity maps (filled squares) relative to a diffraction-limited imaging method (e.g., as described in US20160046988) (empty circles). The localization of each individual binding or dissociation event, followed by clustering and kinetic analysis of the binding or dissociation events, permits the resolution of multiple closely spaced target analytes on a surface.

Example 3

Specificity of the Assay

Figure 3A:
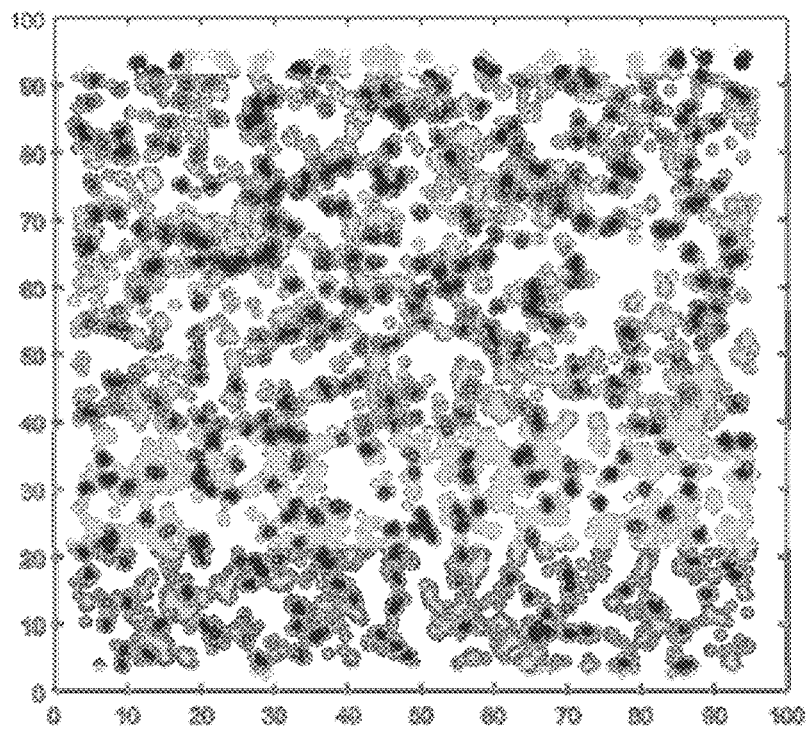
FIG. 3A-B shows a representation of binding event clusters identified during experiments described herein in the presence of target analyte only (FIG. 3A) and in the presence of an interfering background analyte, but in the absence of the target analyte (FIG. 3B).
Figure 3B:
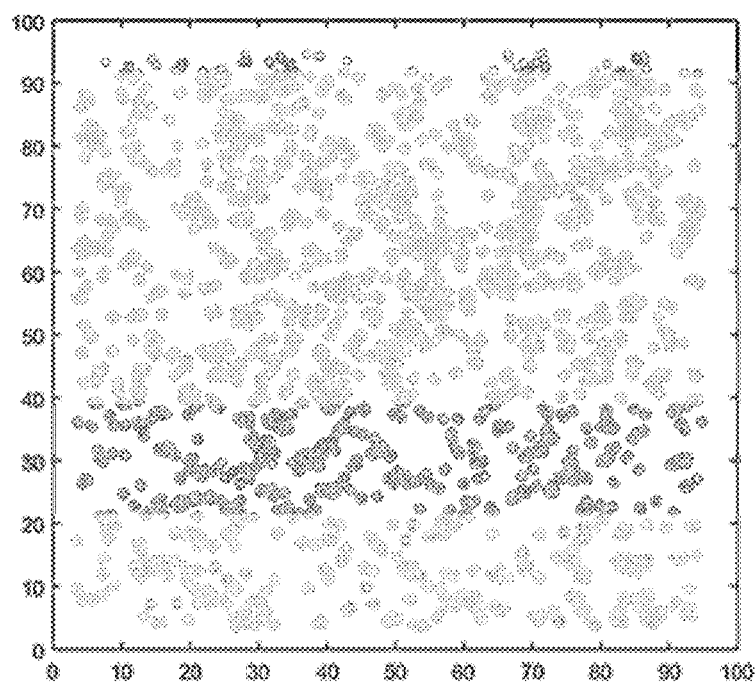

During the development of the technology described herein, experiments were conducted to assess the specificity of the super-resolution imaging and event clustering technologies as described herein. In particular, the specificity of detection of a nucleic acid comprising a mutant sequence was tested by comparing the number of molecules detected in the presence of either (1) only mutant sequence at a known concentration, or (2) only wild-type sequence at a 10,000-fold higher concentration. In the presence of the mutant DNA sequence, several (e.g., approximately 399) clusters of binding events (FIG. 3A, dark black spots) within an imaging field of view exhibited kinetics characteristic of query probe binding to the mutant sequence, while nonspecific binding events (FIG. 3A, light gray circles) are removed by statistical analysis. In contrast, when the same experiment was performed in the absence of mutant and in the presence of a 10,000-fold higher concentration of wild-type DNA sequence, all query probe binding events are removed by statistical analysis of local clusters of events, resulting in no false positive detection events (FIG. 3B).

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A system for detecting or quantifying a protein analyte in a sample, the system comprising:
  (a) a protein analyte-specific capture probe that stably immobilizes a protein analyte to a surface;
  (b) a query probe that binds to the protein analyte with a dissociation rate constant ($k_{off}$) for the analyte that is greater than $10^{-2}$ $s^{-1}$;
  (c) a fluorescence microscope having single-molecule sensitivity and configured to provide a series of images of the surface; and
  (d) a processor programmed to execute instructions to:
    process each image of said series of images to measure signal intensities produced by a query probe binding to a protein analyte and/or by a query probe dissociating from a protein analyte;
    record said signal intensities at the surface as a function of (x, y) position on the surface;
    produce a differential signal intensity map comprising time-dependent signal intensity changes at the surface as a function of (x, y) position by subtracting an intensity value of each pixel P of each image N from a corresponding intensity value of the same pixel P of each subsequent image N+1, wherein the (x, y) position of each time-dependent signal intensity change is determined by processing the differential intensity map using centroid determination, least-squares fitting to a Gaussian function, least squares fitting to an Airy disk function, least squares fitting to a polynomial function, or maximum likelihood estimation;

cluster the time-dependent signal intensity changes at the surface using (x, y) position to produce event clusters; and calculate a kinetic parameter for each event cluster to detect or quantify the protein analyte.

2. The system of claim 1, wherein the query probe comprises an antibody, antibody fragment, aptamer, nanobody, kinase, phosphatase, acetylase, deacetylase, enzyme, polypeptide, or a small organic molecule.

3. The system of claim 1, wherein the protein analyte-specific capture probe is a surface-bound capture probe.

4. The system of claim 3 wherein the protein analyte-specific capture probe is an antibody, antibody fragment, or nanobody.

5. The system of claim 1, wherein the protein analyte is denatured.

6. The system of claim 1 wherein the surface is a solid support.

7. The system of claim 1 wherein a diffusible solid support comprises said surface.

8. The system of claim 1 wherein the protein analyte is a component of a macromolecular complex.

9. The system of claim 1 wherein the protein analyte comprises a post-translational modification.

10. The system of claim 9, wherein a chemical affinity tag mediates a transient association between the protein analyte comprising a post-translational modification and the query probe.

11. The system of claim 1 further comprising a component configured to thermally denature the analyte prior to surface immobilization or further comprising a chemical denaturant to chemically denature the analyte prior to surface immobilization.

* * * * *